US007410664B2

(12) United States Patent
Hanselmann

(10) Patent No.: US 7,410,664 B2
(45) Date of Patent: Aug. 12, 2008

(54) CHOCOLATE PRODUCTS AND INGREDIENTS AND METHODS FOR PRODUCING NOVEL OIL-IN-WATER SUSPENSIONS HAVING REDUCED WATER ACTIVITY LEVELS

(75) Inventor: William Hanselmann, Hershey, PA (US)

(73) Assignee: The Hershey Company, Hershey, PA (US)

( * ) Notice: Subject to any disclaimer, the term of this patent is extended or adjusted under 35 U.S.C. 154(b) by 0 days.

(21) Appl. No.: 11/098,540

(22) Filed: Apr. 5, 2005

(65) Prior Publication Data

US 2006/0121175 A1 Jun. 8, 2006

Related U.S. Application Data

(63) Continuation-in-part of application No. 11/006,820, filed on Dec. 8, 2004.

(51) Int. Cl.
*A23G 1/00* (2006.01)

(52) U.S. Cl. ...................................... 426/631; 426/660

(58) Field of Classification Search .................. 426/631
See application file for complete search history.

(56) References Cited

U.S. PATENT DOCUMENTS

| | | | | |
|---|---|---|---|---|
| 4,234,611 | A * | 11/1980 | Kahn et al. | 426/321 |
| 4,235,939 | A | 11/1980 | Kimberly, Sr. et al. | |
| 4,362,758 | A | 12/1982 | MacNeil et al. | |
| 4,443,487 | A | 4/1984 | Darling | |
| 4,623,552 | A * | 11/1986 | Rapp | 426/575 |
| 4,637,937 | A | 1/1987 | Terada et al. | |
| 4,948,600 | A * | 8/1990 | Zumbe et al. | 426/45 |
| 5,108,769 | A | 4/1992 | Kincs | |
| 5,160,760 | A | 11/1992 | Takemori et al. | |
| 5,190,786 | A | 3/1993 | Anderson et al. | |
| 5,425,957 | A | 6/1995 | Gaim-Marsoner et al. | |
| 5,468,509 | A | 11/1995 | Schlup et al. | |
| 5,894,031 | A | 4/1999 | Caly et al. | |
| 6,146,672 | A | 11/2000 | Gonzalez et al. | |
| 6,165,540 | A | 12/2000 | Traitler et al. | |

FOREIGN PATENT DOCUMENTS

| | | |
|---|---|---|
| DE | 1692379 | 3/1972 |
| EP | 0 135 768 A2 | 4/1985 |
| EP | 0 317 899 A2 | 5/1989 |
| EP | 0463 688 A1 | 1/1991 |
| EP | 0 566 428 A1 | 10/1993 |
| JP | 3139241 A | 6/1989 |
| JP | 1997037716 A | 2/1997 |
| JP | 2001149014 A | 6/2001 |
| WO | WO 98/01488 | 1/1998 |
| WO | WO 00/32057 | 6/1999 |
| WO | WO 0195737 | 12/2001 |

OTHER PUBLICATIONS

Peterson, M. S. 1978. Encyclopedia of Food Science. The AVI Publishing Company, Inc., Westport, CT, p. 853-857.*

Cracknell et al, 1972. Practical Professional Cookery. MacMillan Press LTD, London. p. 809-810.*

Hershey Chocolate Corporation. 1983. Hershey's 1934 Cookbook. Hershey Chocolate Company, Hershey, PA, p. 53.*

McGee, 1984. On Food and Cooking, MacMillan Publishing Co., New York, p. 335-341.*

D'Amico, J. et al., 1995. Teh Science Chef. John Wiley & Sons, Inc., New York. p. 113-117 and 119.*

Farmer, Fannie Merritt. 1896 facsimile. The Original Boston Cooking-School Cook Book. Weathervane Books, New York, p. 334.*

Teubner, C. et al. 1997. The Chocolate Bible. Penguin Studio, New York, p. 40-41.*

Wesler, C. 2000. The Complete Cooking Light CookBook, Oxmoor House. New York. p. 510.*

Rockland, L. B. 1987. Water Activity: Theory and Applications to Food. Marcel Dekker, Inc., New York. p. 287-290.*

Anishchenko B.I., et al., Against the nun moth, Zashchita Rastenii, 1982, No. 4, p. 17f (English Abstract).

Barrile J, et al., Effect of Added Moisture on the Heat Resistance of *Salmonella anatum* in Milk Chocolate, Applied Microbiology, Jan. 1970, 177-178.

Cacace D, et al., Composition and characteristics of food emulsions, Industria Conserve, 1992, 67, 81-86 (English Abstract).

Directive 2000/36/EC of the European Parliment and council of Jun. 23, 2000 relating to cocoa.

Fruman D.H., Development of a Batchwise In-Situ Regeneration Type Separator to Remove Oil from Oil-Water Suspensions, TR-7080-3; MA-RD-930-75060, 1974, p. 117, Hydronautics, Inc.

Fryer P, et al., The Material Science of Chocolate, Materials Res. Soc'y Bull., Dec. 2000, 25-29.

(Continued)

*Primary Examiner*—Carolyn Paden
(74) *Attorney, Agent, or Firm*—Wiley Rein LLP

(57) ABSTRACT

The invention provides novel means and methods for manipulating cocoa and milk ingredients, for example, to produce edible oil-in-water suspensions and drying the suspensions to reduce the moisture or water activity level. In one embodiment, cocoa products are used to produce a gel network formed by cocoa starches and/or proteins. The suspension is formed with milk proteins and cocoa solids and also comprises crystallized cocoa butter as a dispersed component, and water or skim milk as the continuous phase or aqueous phase, and the suspension is optionally dried to reduce the moisture content and/or manipulate the final texture or characteristics. The compositions, products, and ingredients possible according to the invention provide novel methods and components for low or reduced calorie or sugar free chocolate products or ingredients having the same cocoa content as conventional chocolate and/or falling within the standard of identity for chocolate products. In addition, the production and packaging options for chocolate products are expanded by the use of the invention as the viscosity of the chocolate product or ingredient can be varied easily without specific reliance on cocoa butter content.

53 Claims, 10 Drawing Sheets

OTHER PUBLICATIONS

Geilinger L, et al., Isolation and Characterization of Native Starch from Cocoa Bens, Starch/Staerke 33, 1981, No. 3, pp. 76-79.

Health Canada, Food annd Drug Regulations, B.04.001.-012., May 1997.

Hollowood, TA, et al., The Effect of Viscosity on the Perception of Flavour, Chem. Senses, 27: 583-591, 2002.

Jingkun Li, et al., Effects of ice-nucleation active bacteria on the freezing of some model food systems, Internal Journal of Food Science & Technology, 1997, 32, 41-49.

Jiugao Y, et al., Effects of suspension crosslinking reacting conditions on the sizes of starch microspheres, Starch/Starke, 1994, 46, 252-255.

Krushev, L.T., et al., Addition of an exotoxin to increase the effectiveness of bacterial preparations, Lesnoe Khozyaistvo, 1972, 8, 59-61 (English Abstract).

Meursing E.H., Cocoa powders for industrial processing, 1983, Knijnenberg B.V., Holland.

Pongsawatmanit, R. et al., Effect of Sucrose on RVA Viscosity Parameters, Water Activity and Freezable Water Fraction of Cassava Starch Suspensions, ScienceAsia, 28 (2002): 129-134.

Schmeider R.L., et al. Characterization and Quantification of Starch in Cocoa Beans and Chocolate Products, Journal of Food Science, 1980, 45, 555-557.

U.S. Food and Drug Administration, 21 Code of Federal Regulations, Apr. 2, 2002, 163.123 and 163.130.

Voight J., et al., The major seed proteins of Theobroma Cacao L., Food Chemistry, 1993, 47, 145-151.

Zak D.L., et al., Extraction and fractionation of cocoa proteins as applied to several varieties of cocoa beans, J. Aggric. Food Chem., 1976, 24, No. 3, 479-483.

Zak D.L., et al., Changes in cocoa proteins during ripening of fruit, fermentation, and further processing of cocoa beans, J. Agric. Food Chem., 1976, 24, No. 3, 483-48.

Zumbe A, et al., Polyols in confectionary: the route to sugar-free, reduced sugar and reduced calorie confectionary, British Journal of Nutrition, (2001), 85, Suppl. 1, S31-S45.

VanNostrand's Scientific Encyclopedia, 4th Ed., 1968 (Emulsion and Suspension).

Beckett, S.T., Industrial Chocolate Manufacture and Use, 3rd Ed., pp. 154, 380.

Servais, C, et al., The Influence of Particle Size Distribution on the Processing of Food, Journal of Food Engineering, vol. 51, Issue 3, Feb. 2002, pp. 201-208 (Abstract).

Petursson S, et al., Stabilization of oil-in-water emulsions by cod protein extracts, J Agric Food Chem., Jun. 16, 2004: 52 (12): 3996-4001 (Abstract).

Paquin P, Technological properties of high pressure homogenizers; the effect of fat globules, milk proteins, and polysaccharides, International Dairy Journal, vol. 9, Issues 306, Mar. 1999, pp. 329-335 (Abstract).

Kiokas S, et al., Stability of whey-protein-stabilized oil-in-water emulsions during chilled storage and temperature cycling, J Agric Food Chem., Jun. 16, 2004; 52(12): 3823-3830 (Abstract).

Coupland J, et al., Droplet size determination in food emulsions: comparison of ultrasonic and light scattering methods, Journal of Food Engineering, vol. 50, Issue 2, Nov. 2001, pp. 117-120 (Abstract).

Akar, et al, Polymer Science and Technology, Chapter 4, Suspension Polymerization, pp. 16-17.

Roelofs P. et al., Reduction of dust concentration in pig facilities by regular spraying of an oil emulsion, 2001, CAB Accession No. 20013119015.

* cited by examiner

CHOCOLATE PRODUCTS AND INGREDIENTS AND METHODS FOR PRODUCING NOVEL OIL-IN-WATER SUSPENSIONS HAVING REDUCED WATER ACTIVITY LEVELS

RELATED APPLICATIONS

This application is a continuation-in-part and claims priority benefit of prior U.S. patent application Ser. No. 11/006,820, filed Dec. 8, 2004, pending, the entire contents of which are hereby incorporated by reference.

FIELD OF THE INVENTION AND INTRODUCTION

The invention relates to novel methods for manipulating protein and polysaccharide/starch components of food products or ingredients, and in particular cocoa-containing products, as a food ingredient and as a final food product. In one aspect, the invention encompasses a chocolate composition comprising a gel network formed by cocoa starches and/or proteins, or milk proteins and cocoa solids, and also comprising crystallized cocoa butter as a dispersed component, and water or milk or skim milk as the continuous phase or aqueous phase of a suspension. Previously, chocolate compositions employed cocoa butter as the continuous phase in compositions and suspensions, generally with sugar, milk solids and cocoa solids as the dispersed phase. Both liquid cocoa compositions and solid compositions traditionally follow this standard. The compositions, products, and ingredients possible according to the invention, however, can utilize the gel forming potential of starch and protein components of cocoa ingredients and/or other ingredients to create a wide range of oil-in-water suspensions with advantageous properties. For example, recipes for a low or reduced calorie chocolate product or ingredient having the same cocoa content as conventional chocolate and/or falling within the standard of identity for chocolate products can be designed. In a preferred embodiment, the invention encompasses a drying step to control the water activity of a final product or composition and afford microbiological stability to the product or composition. In addition, the production and packaging options for chocolate products are expanded by the use of the invention as the viscosity of the chocolate product or ingredient can be varied easily without specific reliance on cocoa butter content.

DESCRIPTION OF RELATED ART

Chocolate products and ingredients conventionally exist as suspensions, with fat or oil as the continuous phase. Polymorphic crystals of cocoa butter form an important part of the fine structure of these suspensions and the methods to control crystallization of cocoa butter are well known. In general, the setting of cocoa butter crystals into the most stable form is desirable. The failure to account for the difference in forms within the fat suspension can result in poor color and blooming.

From a production point of view, cocoa butter content has been changed to vary the viscosity of chocolate compositions, so that higher cocoa butter content results in a more viscous final product or ingredient. While heating may be used to increase flowabilty or solubility of certain ingredients in chocolate processing or packaging, heating is not used as a method to change the properties of cocoa-containing compositions.

SUMMARY OF THE INVENTION

The present invention relates to a food product or ingredient having a crystallized and gelatinized structure in an oil-in-water suspension. The combination of a gelatinized structure, a crystallized structure, and an oil-in-water suspension made possible and demonstrated by the methods, food products and ingredients of the invention provide numerous advantages in the food processing field. For example, the invention provides products with improved viscosity characteristics over a greater range of temperatures and allows sugar free or low or reduced calorie products to be produced while maintaining other desirable characteristics, such as texture, taste, mouthfeel, and viscosity. Furthermore, the invention can be said to incorporate methods and ingredients, or more particularly moisture levels, that standard practices report as inappropriate or undesirable in the chocolate manufacturing field. For example, Beckett (Industrial Chocolate Manufacture and Use, 3d Ed., Beckett ed., 1999 Blackwell Science Ltd., see Chaps. 9 and 20 in particular) notes that it is necessary to remove moisture during processing of chocolate to avoid the requirement to use additional fat and to avoid or minimize the possibility of microbial growth. In addition, Minifie (Chocolate, Cocoa, and Confectionery, 3d Ed., 1999, Aspen Publishing, see Chap. 5 in particular) notes the importance of minimizing the introduction of water in chocolate processing in order to maintain a desired viscosity. Thus, in one aspect, by using water or water-based solutions as the aqueous phase in an oil-in-water solution for cocoa and/or chocolate food ingredients or products, the invention utilizes counter-intuitive methods and ingredients as compared to typical chocolate product and ingredient manufacturing. Optionally, however, the moisture content or water activity of the final product or composition according to the invention can be manipulated to a desired level in order to reduce or eliminate microbiological growth or contamination. In addition, one of skill in the art can select a desired microstructure or characteristics for a final product by manipulating the moisture level. For example, depending on the final moisture level, a product can vary from a plastic state to a brittle, crisp product. In a preferred example, a chocolate product having a water activity (Aw) of about 0.85 is typically a creamy, smooth paste, while at a Aw of about 0.6 it is rather chewy, like a caramel, and at about 0.3 it is crisp and brittle, like a dried chip. Typically, the control of water activity is through a drying process or a final drying process, but any known or available process can be used.

In one embodiment, the food ingredient comprises an oil or fat phase comprising at least about 2% or at least about 3% cocoa solids and at least about 2% or at least about 3% cocoa butter, the cocoa solids being in suspension and/or at least partially crystallized in the final ingredient or product at room temperature. In various embodiments involving cocoa or chocolate, the cocoa butter and cocoa solids content from one or more of a variety of added cocoa-containing products can be selected to generate a range of final weight percent values, including from about 2% to about 3% cocoa butter, about 3% to about 5% cocoa butter, about 5% to 10% or higher cocoa butter, and about 2% to about 3% cocoa solids, about 3% to about 5% cocoa solids, and about 5% to 10% or higher cocoa solids, and any combination of these ranges. In one aspect, the invention does not encompass prior or conventional chocolate milk mixtures that do not possess or are not treated to generate a gelatinized and/or oil-in-water suspension as described here. Generally, prior chocolate milk mixtures do not form stable suspensions, as one of skill in the art understands.

The food ingredients or products of the invention or used in the invention are not limited to any particular state or temperature, for example room temperature. The reference to crystallized or partially crystallized structures at room temperature means the food ingredient or product is capable of exhibiting a crystallized or partially crystallized structure or microstructure when at room temperature. Thus, in part, the suspension has a crystallized structure. The food ingredient further comprises an aqueous phase comprising water or milk or skim milk, such as a composition of at least about 5% milk solids and at least about 5% nutritive carbohydrate sweetener. The soluble starches or polysaccharides and protein present in at least the cocoa solids, or other cocoa product, are capable of forming a gel network in the suspension. Thus, in part, the suspension has a gelatinized structure. The insoluble particles from at least the cocoa, such as the cocoa cell wall materials, are dispersed within the gel network forming part of the suspension. While cocoa-containing compositions are routinely referred to, the invention is not limited to cocoa-containing compositions. Other food ingredients or edible compositions can be used.

In a specific embodiment, the food ingredient of the invention has at least about 15%, or at least about 18%, or at least about 20% cocoa solids by weight in its final ingredient form or product form. Thus, the methods and ingredients and products of the invention can be used in the production of various chocolate products that fall within the standard of identity for chocolate, milk chocolate, bittersweet chocolate, and white chocolate that may exist in a desired market or under a particular regulatory setting. Furthermore, artificial or non-nutritive sweeteners can be used in conjunction with the invention to produce low calorie or low carbohydrate products or sugar free products. Also, vitamin and/or mineral food additives can be optionally added to improve the nutritional content of chocolate or cocoa-containing foods, for example.

In another aspect, the invention comprises a method of making a food ingredient where a fat or oil phase composition comprising cocoa butter, milk fat and/or other edible fat, and optionally an emulsifier, is mixed with an aqueous or continuous phase comprising water or milk. The mixing can be performed by a variety of methods known to the food and food ingredient industries, and specifically includes an homogenizer, dynamic mixer, or static mixer processes. After preparing the oil-in-water suspension, the mixture of the oil or fat phase with the aqueous or continuous phase can be heated under conditions where the protein and starch components of the cocoa solids, for example, produce a gel network. In general terms, the gel network is functionally a gelatinized composition having an increased viscosity compared to its pre-treatment or pre-heated form. It can be prepared from biopolymer-containing components, such as protein and/or carbohydrate containing components, particularly cocoa products, such as cocoa solids, and milk products, such as milk solids. One of skill in the art is familiar with methods and equipment for measuring the viscosity of compositions, including the compositions noted here. Without limiting the invention to any particular mechanism, the protein and/or soluble carbohydrate or starch components in a composition of food ingredients, such as a cocoa-containing composition, can be effectively swelled or water-saturated by particular treatments or heating processes depending on the components of the composition. In preferred treatments, the gel network formation occurs efficiently by heating to a range between about 52° C. to about 68° C. for cocoa-containing compositions. Gel network formation in the same cocoa-containing compositions can also occur through prolonged standing, with or without mechanical shearing. Functionally, the treating or heating step should disrupt the native protein conformation and/or swell carbohydrate or starch or biopolymer components from their existing state in order to form a gel network. Since the swelling of cocoa product components can take long periods of time and/or employ mechanical treatments, the preferred method of preparing a gel network according to this invention is by heating.

Once a gel network is formed or after a gel network is formed, an optional drying process can be incorporated into the treating or heating process, as noted above, or a drying or heating process can be additionally employed to reduce or manipulate the water activity level of the final product or composition. This heating or drying step can be separate from the treating or heating to form a gel network, or it can be incorporated as part of the treating or heating process to form a gel network by monitoring the evaporation of moisture from the product or composition. In general, any method can be used to heat, dry, or evaporate moisture from the product or composition to produce a desired water activity level. For chocolate or cocoa containing products or compositions, the water activity level is preferably below about 0.9, more preferably between about 0.75 and about 0.65, or below 0.65, and it can be as low as about 0.33 or lower. In fact, several ranges of water activity can be used for final products or ingredients under the invention, such as about 0.9 to about 0.8, about 0.85 to about 0.8, about 0.8 to about 0.75, about 0.75 to about 0.65, about 0.65 to about 0.55, about 0.55 to about 0.45, about 0.45 to about 0.4, about 0.4 to about 0.35, about 0.35 to about 0.3, or below about 0.35, or below about 0.9, or any combination of these ranges.

Any appropriate measurement of water activity can be used, such as chilled mirror devices or electrical resistance or capacitance devices. In addition to the stated water activity levels above, the drying process can be used to functionally provide a safe moisture level to the final product or composition, such as a moisture level low enough to prevent the growth of undesirable microorganisms in the final product or composition under selected conditions for manufacturing, storage, and/or distribution. For some chocolate products, a water activity level below about 0.65 is desired for normal, stable storage and distribution conditions. However, if certain microstructures and/or product densities and/or product characteristics are desired, a higher or lower water activity can be selected. Thus, the final product can vary from a creamy, pudding-like product or composition to a crisp, or chip-like product or composition. One of skill in the art is familiar with the use of deep bed driers, tray driers, belt driers, fluidized bed driers, tunnel driers, sun and solar driers, heated-surface driers, drum/roller driers, cooking extruder, vacuum and vacuum shelf driers, freeze driers, and any other drying or moisture-evaporating devices or processes to manipulate water activity levels.

In the photomicrographs of FIGS. 5 and 6, one can see the difference between the treated or heated cocoa components and the same components after conventional cocoa processing. In general, the methods of the invention allow for a microstructure of cocoa-containing compositions or suspensions where the cocoa butter droplets can be from about 0.5 to about 100 microns in diameter, or more preferably about 0.5 to about 30 microns in diameter. Furthermore, the carbohydrate or starch components of the cocoa products used or the cell components from the cocoa products used are visibly swelled in the methods and products of the invention (see FIG. 6), while in the conventional dark chocolate composition of FIG. 5, by comparison, they are typically present as crystallized and/or amorphous components in the suspension. In addition, the sugar in the suspension of FIG. 6 is dissolved in the continuous phase rather than in crystalline structures as shown in the conventional composition of FIG. 5, thus leading to a more uniform and smoother texture.

FIGS. 7 and 8 are photomicrographs after a drying process to reduce or manipulate the water activity level. By reducing the moisture to about 4%, or a water activity of about 0.3, the final chocolate product can be made into a dry or crisp structure, and/or where the sucrose might be partially recrystallized (as shown in the Figures). The low moisture products can thus be caramel-like or a crisp, chip texture. Accordingly, reducing or manipulating water or moisture levels from the continuous aqueous phase enables the artisan to achieve microbiological stability and flexibility in final texture to the product or composition. For example, if all the components are first dissolved in excess water, then the composition allowed to form a gel network structure, reducing the water or moisture level would initially results in caramel-like, highly viscous or relatively highly viscous oil-in-water suspension. Further drying or additional reduction in moisture creates a crisp chocolate product, whereby a structure of essentially immobilized and/or partially crystallized sucrose or sugar is formed. Thus, the invention provides very unique texture and viscosity possibilities for any selected confectionery products and chocolate products, in particular.

In another aspect, the invention provides a novel oil-in-water suspension at temperatures below the melting point of cocoa butter in a cocoa butter containing composition. In this and other aspects of the invention, cocoa butter is discussed as part of the fat or oil phase. However, other cocoa containing products can be used, such as cocoa liquor or cocoa powder. In addition, one of ordinary skill in the art is familiar with adding emulsifiers and/or hydrocolloids and/or other biopolymers to cocoa products, and emulsifiers and hydrocolloids and protein and starch compositions can optionally be added or replaced by cocoa butter in the food ingredients, products and compositions of the invention. Beyond cocoa butter or other cocoa products, additional fat components can be added in the methods to produce the food ingredients or products of the invention, especially including those with a melting point above room temperature or at or above about 25° C. or at or above about 35° C. As shown below, fractionated and/or hydrogenated and/or interesterified palm kernel oil, palm oil, coconut oil, cottonseed oil, sunflower oil, canola oil, and corn oil, or cocoa butter substitute, for example, can be used as an edible oil with a melting point above room temperature.

In particular aspects, the invention includes processing a food ingredient into a processed product or composition. The processed products or compositions can be prepared by any method of the food and confectionery industry. For example, in-process steps can include adding components, such as adding vitamins, minerals, nuts, peanuts, peanut butter, almonds, caramel, edible inclusions, food grade gas, and one or more of the variety of ingredients available. Processing can also or in addition involve producing a marketable food product by coating, forming, molding, extruding, enrobing, injecting, baking, freezing, packaging, layering, rolling, cutting, depositing, panning, casting, or any other available method (see, for example, Minifie, "Chocolate, Cocoa, and Confectionery," 3d ed., Aspen Publishers). Additionally, filtration or separation processes can be included to, for example, remove substantially all insoluble particles from an ingredient or food product. As noted above, further or alternative processing steps may include drying of the composition or final product in order to produce a water activity level consistent with a microbiologically stable product. In general, microbiologically stable refers to a shelf life substantially similar to a conventional product of the same type.

As noted above, the preferred process for forming a gel network is heating. For the cocoa product containing compositions, heating the mixed oil and aqueous phases can comprise heating to about 68° C. for a period of time sufficient to form a gel network. In general, for cocoa containing products, cocoa starch can be formed into a gel network if it is subjected to a temperature of about 52° C. to about 68° C., so any heating process that results in the cocoa starch reaching this temperature should suffice. Other, lower temperatures can also be selected and used if longer periods of time are employed. Higher temperatures for heating, for example to about 121° C. for about 8.5 minutes, or to about 150° C. for at least about 4 seconds, can be used in optional processing methods or optional sterilizing methods. Other methods include allowing the mixture to rest at room temperature for a period of time sufficient to form a gel network, or using high shear conditions, for example with a high pressure homogenizer.

In some of the many possible food products that can be produced, the food ingredient of the invention can be further processed into a product containing milk chocolate, sweet chocolate, bittersweet chocolate, semisweet chocolate, or white chocolate. In addition, the product can comprise one or more of chocolate liquor, cocoa powder, heavy cream, anhydrous milk fat, whey protein concentrates, non-fat milk protein, whole milk powder, sugar, lecithin, vanillin, and skim milk, as shown in the examples below.

In a more general aspect, the invention involves preparing an oil-in-water suspension using one or more cocoa containing products. The cocoa containing products are those processed from, or some degree of processed form of, the cacao bean that are commonly available. As noted above, certain microstructure environments can be created using the protein and starch components from the cacao bean products. While the production of oil-in-water emulsions in chemical processes is not new, the use of oil-in-water suspensions for cocoa containing products in particular, and food products more generally, is not common. In addition, the use of oil-in-water suspensions for chocolate products falling under one or more of the many standards of identity for these products has not been previously described. In another general aspect, the invention comprises preparing an edible gelatinized and crystallized microstructure within an oil-in-water suspension by using a gel network forming biopolymer containing product, such as a cocoa product, a milk product, a fruit product, a berry product, or a vegetable product. A gel network-forming amount of a biopolymer is used and the suspension comprises an aqueous phase and a dispersed oil or fat phase, wherein the gel network is capable of being formed from the biopolymer after heating the suspension, and the components of the oil or fat phase are at least partially crystallized at room temperature and stably present in the suspension. By the phrase "stably present in suspension," the components of the suspension remain substantially in suspension for a period of up to 3 months, or up to 6 months, or up to 8 months, or up to 12 months, or up to 18 months, or up to 24 months or longer. The microstructures of the dispersed phase can be selected to have a size of about 100 um or less in diameter while in the suspension. The food ingredient made from these suspensions can have a biopolymer originally provided in the form of a cocoa containing product, a fruit containing product, a berry containing product, or other similar product, or even a hydrocolloid containing product. This food ingredient can also or alternatively comprise a component in the oil or fat phase that is at least partially crystallized at room temperature and can be selected from one or more of cocoa butter, fractionated and/or hydrogenated and/or interesterified palm kernel oil, palm oil, coconut oil, cottonseed oil, sunflower oil, canola oil, and corn oil, 17-sterine, cocoa butter substitutes or equivalents, milk fat, or any oil or fat that is at least partially solid or crystallized at room temperature, or at about 20° C., or at about 25° C., or at about 30° C. In addition, the invention specifically includes a final food product that comprises any of the food ingredients noted or any food ingredient produced by a method noted throughout this disclosure.

As discussed here, the oil-in-water suspension refers to a suspension of, for example, oil droplets and/or insoluble particles in a continuous medium or phase, whereas in an emulsion, by contrast, all components are dissolved in the continuous phase. In general for the food rheology field, a suspension is at least one solid dispersed within a continuous phase, where the continuous phase is at least one liquid (see, for example, Van Nostrand's Scientific Encyclopedia, D. Van Nostrand Co., Inc., Princeton, N.J., 4$^{th}$ ed. 1968, pp. 620 and 1782; Rheologie der Lebensmittel, Weipert/Tscheuschner/Windhab, Behr's Verlag, Hamburg, Germany, 1993, pp. 108 and 122). The edible oil-in-water suspension of this invention refers to a dispersed phase of oil droplets and insoluble particles that are suspended in a substantially stably manner within an aqueous continuous phase, whereas in an emulsion all of the dispersed phase components must be liquid and are merely mixed in the continuous phase and are not, generally, stably suspended. Furthermore, emulsions do not necessarily employ the gel network as mentioned here. In fact, there are no reports of cocoa-based gel networks used to produce edible oil-in-water suspensions as described here. Thus, in general, the suspensions of the inventions comprise a dispersion of crystalline and/or non-soluble droplets and/or particles dispersed in a gel network or gelatinized continuous aqueous phase. While cocoa-based oil-in-water suspensions are noted as a preferred embodiment, other biopolymer-containing compositions can be used also.

In one aspect of a method of producing a cocoa-based oil-in-water suspension, the method involves mixing a fat phase comprising one or more cocoa products, including cocoa butter, and having cocoa protein and/or starch or carbohydrate components, with an aqueous phase. In preferred embodiments, the final non-fat cocoa solids content is at least about 2% or about 3% or about 4% or more by weight of the final suspension. Also in preferred embodiments, the aqueous phase comprises water, a sugar or sweetener, or both, and/or milk and/or skim milk and/or cream. Other liquids or solutions can also be used as the aqueous phase and the invention specifically includes chocolate or cocoa compositions prepared without milk or milk products, even chocolate or cocoa beverages without milk. Once mixed, a swelling or heating step occurs to form a gel network comprised of cocoa proteins and cocoa starch components. The formation of a gel network can be detected by a variety of methods known in the art, including microscopy, direct viscosity measurements, ultrasonic methods, and light scattering methods. If a viscosity measurement is used, one preferred detectable change is where the viscosity of the suspension increases after heating when measured as shear rate. More particularly, the viscosity increase is at least about two-fold or double in the measurable 30sec-1 shear rate. In the optional drying or reducing water activity process, noted above, reducing moisture from the continuous phase produces further viscosity increases, which may depend upon the desired, final moisture level and the desired, final texture. As one of skill in the art will understand, at a certain water activity level the texture and/or density of a final product will essentially stabilize as if a solid. If microscopy is used, one of skill in the art can measure gel formation by the effects on the final suspension and the appearance of component parts within the suspension. For example, starch granules in cocoa-containing compositions can be visualized prior to swelling but not after gelatinization. Cocoa butter droplets can be visualized in the suspension at about room temperature in the range of between 0.5-100 um, or between 0.5-30 um. Again, if the optional drying or reducing moisture process is employed, certain sugars or components may be partially re-crystallized in the microscopic view of the final product or composition.

Throughout this disclosure, applicants refer to journal articles, patent documents, published references, web pages, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention.

DETAILED DESCRIPTION OF EXEMPLARY EMBODIMENTS

Figure 1:
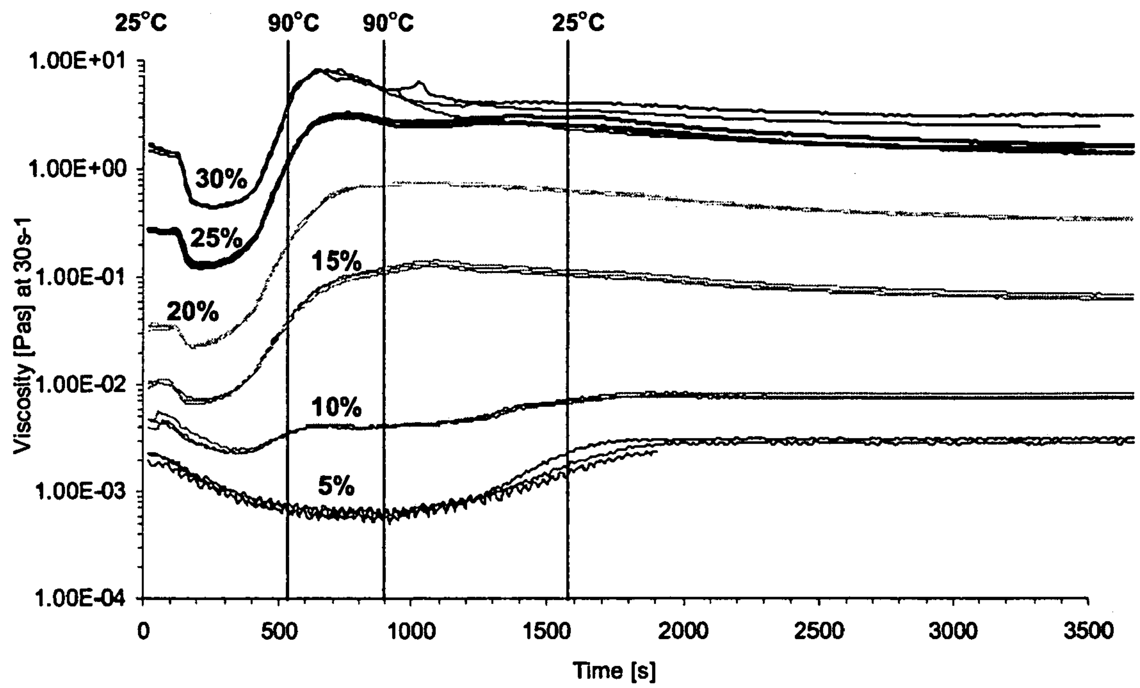
FIG. 1 depicts a graph of the viscosity of a various cocoa compositions during a heating or treating process to form a gel network over time and before any drying process to reduce the water activity level. The levels of cocoa powder in water used in each composition are indicated next to each curve (5%, 10%, 15%, 20%, 25%, and 30%). The heating temperature is indicated at the top. The results show the impact of heating on the formation of a higher viscosity gel network from the components of the cocoa powder. In each case, some change or increase in viscosity can be seen during heating. However, marked increases in viscosity are apparent at 15% cocoa powder and above.
Figure 2:
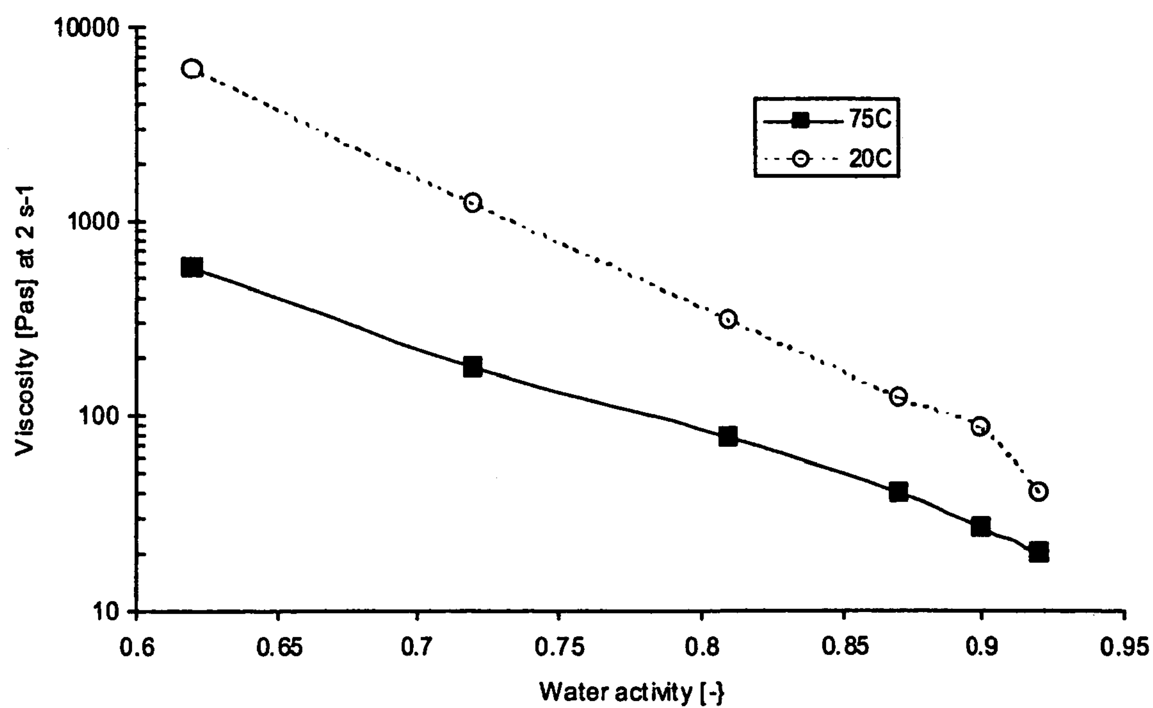
FIG. 2 shows data points of the changes in viscosity of a final product or composition with changes in water activity level at different temperatures. In general, an increase in viscosity accompanies a reduction in water activity.
Figure 3:
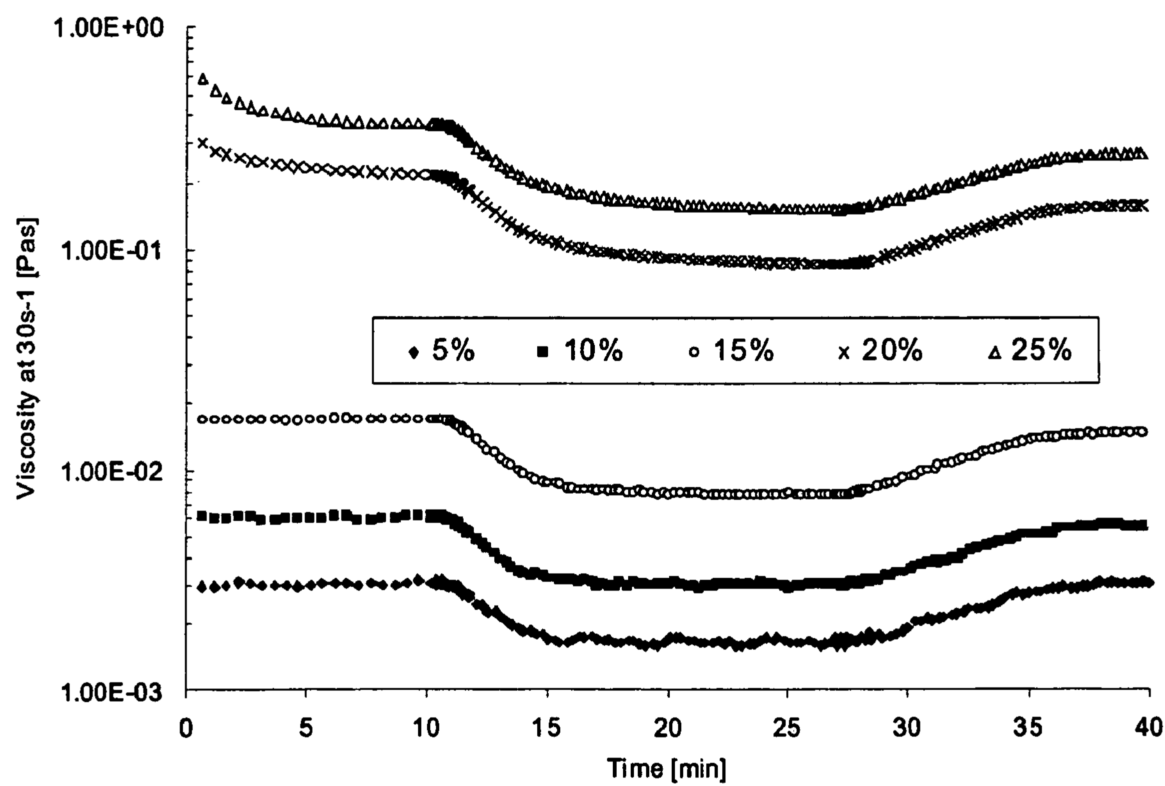
FIG. 3 shows the viscosity characteristics of cocoa butter and skim milk compositions at various (5%, 10%, 15%, 20%, and 25%) concentrations of cocoa butter and over a temperature change. At these temperatures and these periods of time, the change in viscosity represents a change in the crystallization state of cocoa butter droplets in the compositions. From 0-10 minutes, each composition was kept at 20° C.; at 10 minutes each composition was heated until it reached 45° C. at 15 minutes, where the temperature is maintained for 12 minutes. After the heating period, the compositions are allowed to return to 20° C. Viscosity measurements over the changing temperature reflect the melting of oil in the cocoa butter droplets. As is the case in conventional cocoa and chocolate containing compositions, the higher the cocoa butter content the higher the viscosity. Here and throughout this disclosure unless otherwise stated, a TA Instruments AR2000 concentric cylinder is used, DIN 53 019, and a shear rate of 30/sec.
Figure 4:
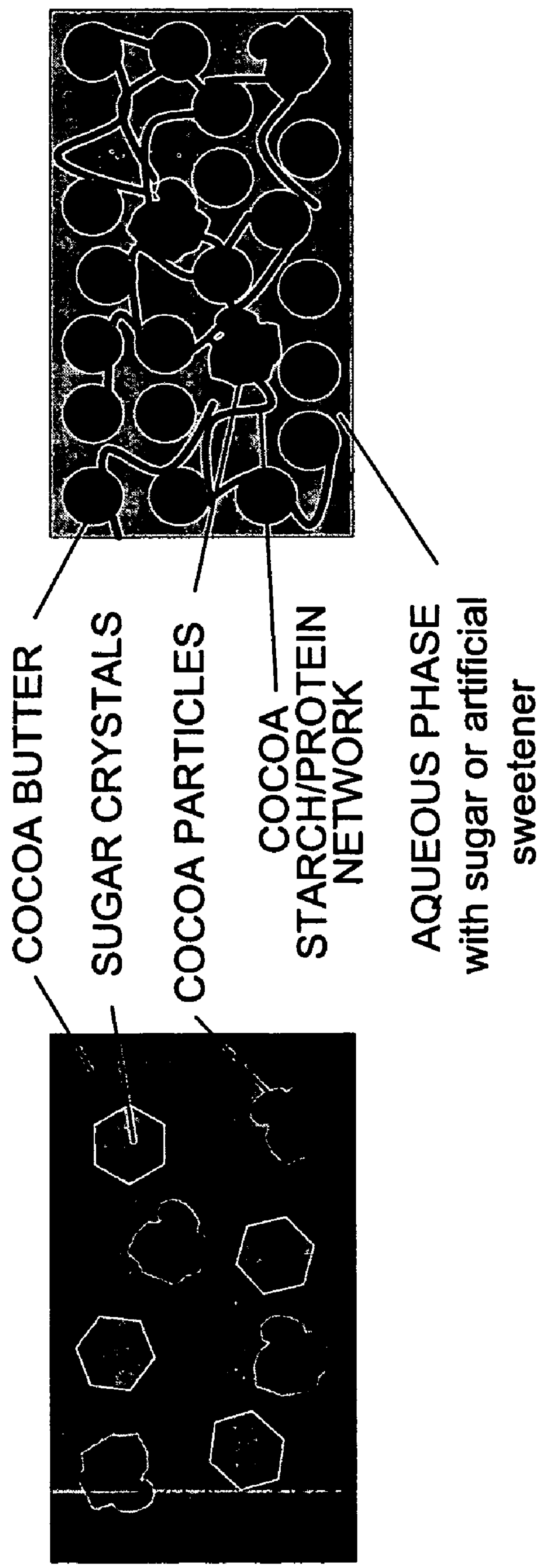
FIG. 4 schematically represents the differences between a conventional composition ("Crystallized Suspension") and the compositions of the invention ("Crystallized/Gelatinized O/W Suspension"). In the conventional composition, cocoa butter is the continuous phase in the suspension. The level of cocoa butter, the solubility of components in cocoa butter, and the physical properties of the suspension, among other things, necessarily limit the characteristics and additives available if one desires to produce a chocolate product or ingredient falling within the standard of identity for chocolate in many countries of the world. In general, hydrophilic molecules are not soluble in oil, or an oil phase like cocoa butter. Consequently, the microstructure of such an oil and hydrophilic combination is referred to as a suspension. However, one fat or oil can be dissolved within another fat or oil, sometimes with an added emulsifier. In contrast, the oil-in-water suspension of the invention contains a continuous phase that can actually be an aqueous phase and the additives and variety and proportion of components is increased and is not limited to fats or oils.

In general and as used in this invention, the various chocolate and cocoa-containing products and compositions noted here refer to the terms as used in Minifie (Chocolate, Cocoa, and Confectionery, 3d ed., Aspen Publishers), specifically incorporated herein by reference. The cacao bean refers to the cacao bean, also called cocoa bean, in nature and a cocoa containing product is a product derived from or having some component derived from the cocoa bean. The nib refers to the cacao bean without the shell and is approximately 54% fat and 46% non fat solids on a dry basis. Non fat cocoa solids are the processed non fat solids of chocolate liquor. Cocoa powder refers typically to cocoa solids with a total of 10% to 12% fat, where the fat is generally cocoa butter. Breakfast cocoa is cocoa solids with 20 to 24% fat, where the fat is generally cocoa butter. Chocolate liquor (or cocoa liquor) is ground cocoa nibs and it can be separated into cocoa butter and cocoa solids. Cocoa butter is the fat component of chocolate liquor, whereas the remaining part of chocolate liquor is cocoa solids or the cocoa mass. As one of skill in the art understands, a certain amount or percentage of cocoa solids in a food ingredient can be achieved, inter alia, by using or adding an amount of cocoa powder, chocolate liquor, or other chocolate or cocoa ingredient containing the requisite amount of cocoa solids. Similarly, a certain amount or percentage of cocoa butter in a food ingredient can be achieved, inter alia, by using or adding an amount of chocolate liquor or other chocolate or cocoa ingredient containing the requisite amount of cocoa butter. Furthermore, while many different countries specifically define food products containing cocoa or cocoa products as having certain ranges or ingredients, the terms chocolate, milk chocolate, and dark chocolate, are as used commonly in the US food industry and do not imply, unless stated otherwise, a specific content. In addition, while a cocoa containing product having a particular anti-oxidant or polyphenol level is not required, the invention encompasses the use of cocoa containing products with enhanced, altered, or increased levels of anti-oxidants or polyphenol compounds as compared to conventional cocoa containing products. Other nutritional, therapeutic, or preventative ingredients can be added as well, as known in the art.

As noted above, in one general aspect, the invention provides a method for producing a gel network or gelatinized structure with a cocoa-containing product. The following table depicts the results of using a heating a process with cocoa powder in water to generate a gelatinized suspension.

Table 1: Viscosity values of various cocoa powder in water compositions before and after heating to 90° C.

| Cocoa Powder [90% non-fat cocoa solids 10% cocoa butter] Wt/wt | Initial viscosity [mPas at 30 sec$^{-1}$] | Peak viscosity | Final viscosity |
|---|---|---|---|
| 5% | 2 | 0.5 | 3 |
| 10% | 4.5 | 4 | 8 |
| 15% | 11 | 130 | 70 |
| 20% | 30 | 750 | 350 |
| 25% | 300 | 3300 | 1500 |
| 30% | 1500 | 8200 | 2500 |

The results shown in Table 1 and FIG. 1 compare various cocoa powder in water combinations and the production of a functional gel network, as determined by measuring viscosity. The cocoa powder and water is first mixed in a rotor stator mixer for about 5 sec to about 1 min or 2 min. A homogenizer or high pressure homogenizer can be used, which produces a minimum droplet size almost instantaneously. Then the compositions of cocoa powder in water are heat treated to produce a gel network. More specifically, cocoa powder is dissolved in water and a 12.2 ml sample poured into a concentric cylinder DIN 53 019 TA Instruments AR2000 Rheometer. A temperature sweep is performed from 25° C. to 90° C. at 10° C./min, holding at 8 minutes at 90° C., cooling from 90° C. to 25° C. at 10° C./min, and holding at 25° C. for 40 minutes. A shear rate of 30/sec is used. At concentrations of about 5% cocoa powder, there is little effect on the viscosity, although it is increased compared to the pre-heating composition. Beginning at about 10% cocoa powder, the viscosity increase is about two-fold or more. Even at the low level of 8 mPas, it is possible to affect the viscosity of cocoa-containing products and ingredients. As one of skill in the art is aware, the ability to monitor changes in viscosity and the microstructure of compositions have a number of processing advantages, including stabilization. At and above about 15%, there is a significant increase in measurable viscosity. The protein and starch components in cocoa products have been discussed in the past (see, for example, Voigt et al., Food Chemistry 47: 145-151 (1993); Schmieder and Keeney, J. Food Sci. 45: 555 (1981); Gellinger et al., Starch/Starke 33: 76-79 (1981)). However, none of these reports mentions the advantages of using the gelatinization of cocoa components to produce food products and ingredients as oil-in-water suspensions, or to produce stable suspensions with cocoa. In fact, the stable suspensions of this invention can be used to prepare cocoa or chocolate products that are stable for months, or from between about 3 months to about 2 years. Furthermore, the products and ingredients of the invention can be designed to provide superior characteristics through a broader range of temperatures, such as freezing temperatures, freezing and thawing conditions, and long term room temperature storage, for example. Food emulsions used today do not have these characteristics. In addition, the optional drying or reducing water activity process can provide further texture or viscosity options and/or microbiological stability. As noted above and shown in the Examples, water activity levels can be in the range of about 0.85 for creamy products, about 0.65 for chewy products, and about 0.35 for crispy products.

Using this basic principle and using the ability of cocoa containing compositions to produce a gel network, examples using a variety of other cocoa containing products and other products can be used. In addition, other ingredients commonly used in chocolate products or defined by the standard of identity for certain chocolate products can be used. For example, chocolate liquor (cocoa and cocoa butter), cocoa butter, milk, concentrated milk, evaporated milk, sweetened condensed milk, dried milk, skim milk, concentrated skim milk, evaporated skim milk or sweetened condensed skim milk, cocoa powder, heavy cream, flavors, whey protein, anhydrous milk fat, non fat milk protein, whole milk powder, soy milk, soy milk proteins, lecithin, sugar and different corn syrups can be used. In general, moisture levels or water activity levels are not generally mentioned in the chocolate product standard of identity. Therefore, the invention can be used to manipulate a variety of ingredients, and substitute a variety of ingredients, for those previously used in chocolate products. While cocoa containing gel networks are described in detail in the examples, the invention is not limited to cocoa-based gel networks and suspensions involving cocoa products. Other biopolymer compositions, such as those containing fruit or fruit puree, proteins, hydrocolloids, polysaccharides, and the like can be used to produce a gel network and combined with at least one fat component having a melting point higher than room temperature, or higher than about 20° C., or higher than about 20-25° C. In addition, other ingredients or additional ingredients, such as fruit products, nuts, nut products, and other larger particle additives can be used in the gelatinized/crystallized suspensions of the invention, such as in certain fruit pudding compositions. In fact, any compatible group or set of ingredients can be selected as long as the components do not substantially inhibit the formation of or substantially destroy or substantially reduce the gel network forming properties of the biopolymer components selected.

EXAMPLES

Using the typical ingredients and substitutions available to the food and confectionery artisan, one can combine the cocoa products, such as cocoa powder above, in a solution to generate a gel network. As an example, in the Examples 1-3 below, the ingredients can be prepared first as fat or oil phase ingredients (for example cocoa butter containing product, such as chocolate liquor) and water or aqueous ingredients (for example milk or skim milk). In addition, typical ingredients for one or more of the chocolate products or food ingredients of the invention include one or more of soy lecithin or lecithin, cream, milk fat, butter, concentrated milk, evaporated milk, concentrated skim milk, evaporated skim milk, concentrated buttermilk, dried buttermilk, malted milk, dried milk, sweeteners, and vegetable fat. After the fat or oil phase ingredients are mixed, the two groups of ingredients (i.e., the aqueous phase and the oil phase) are mixed and/or homogenized and heated to a desired temperature, for example 65° C., or about 52° C. to about 68° C. for inducing a gel network with cocoa-based components. As an optional step, heating to about 120° C. for 15 minutes for sterilization in addition to gel network formation can be used. One of skill in the art is familiar with ultra high temperature or ultra high temperature and pressure sterilization processes that can be selected or adapted for use. Alternatively, swelling in solution can occur after longer periods of time.

Specific examples can be selected using the standards of identity for various countries, including:

U.S. Standard of Identity for Chocolate Products: for semi-sweet or bittersweet chocolate 35% or more chocolate liquor and less than 12% total milk solids; for milk chocolate 10% or more chocolate liquor, 3.39% or more milk fat, and 12% or more total milk solids; and for white chocolate 3.5% or more milk fat, 14% or more total milk solids, 20% or more cocoa butter, and 55% or less nutritive carbohydrate sweetener.

The CODEX chocolate standards: for chocolate 35% or more total cocoa solids, 18% or more cocoa butter, and 14% or more fat-free cocoa solids; for sweet chocolate 30% or more total cocoa solids, 18% or more cocoa butter, and 12% or more fat-free cocoa solids; for milk chocolate 25% or more total cocoa solids, 2.5% or more fat-free cocoa solids, between 12% and 14% milk solids, and between 2.5% and 3.5% milk fat; for white chocolate 20% or more cocoa butter, 14% or more milk solids, and between 2.5% and 3.5% milk fat.

The Brazilian standard of identity: chocolate (milk and dark) 25% or more total cocoa solids; for white chocolate 20% or more total cocoa butter solids.

The European standard Relating to Cocoa and Chocolate Products: chocolate 35% or more total cocoa solids, 18% or more cocoa butter, and 14% or more fat-free cocoa solids; for milk chocolate 25% or more total cocoa solids, 2.5% or more fat-free cocoa solids, 14% or more milk solids, 3.5% or more milk fat, and 25% or more total fat (cocoa butter, cocoa butter equivalents (CBE), and milk fat); for white chocolate 20% or more cocoa butter, 14% or more milk solids, 3.5% or more milk fat.

The Canadian standard for Cocoa and Chocolate Products: for bittersweet or semisweet chocolate 35% or more total cocoa solids (from liquor, cocoa butter or cocoa powder), 18% or more cocoa butter, 14% or more fat-free cocoa solids, and 5 % or less milk solids; for milk chocolate 25% or more total cocoa solids (from liquor, cocoa butter or cocoa powder), 15% or more cocoa butter, 2.5 % or more fat-free cocoa solids, 12% or more total milk solids, 3.39% or more milk fat;

for white chocolate 20% or more cocoa butter, 14% or more milk solids, 3.5% or more milk fat.

The Mexican standard of identity: for chocolate 35% or more total cocoa solids, 18% or more cocoa butter, 14% or more nonfat cocoa solids; for bitter chocolate 40% or more total cocoa solids, 22% or more cocoa butter, 18% or more nonfat cocoa solids; semibitter chocolate 30% or more total cocoa solids, 15.6% or more cocoa butter, 14% or more nonfat cocoa solids; milk chocolate 25% or more total cocoa solids, 20% or more cocoa butter, 2.5% or more nonfat cocoa solids, 14% or more total milk solids, 2.5% or more milk fat, and 40% or more total cocoa and milk solids; for white chocolate 20% or more total cocoa solids, 20% or more cocoa butter, 14% or more total milk solids, 3.5% or more milk fat, and 34% or more total cocoa and milk solids.

The following three examples demonstrate the possible changes in chocolate product ingredients that can be used. These recipes can be manipulated to follow or take into consideration any of the above-mentioned, or any other for that matter, standard of identity for a chocolate product or ingredient. There are advantageous properties in at least the reduction of calories and the reduction in costs. Additional advantages include the ability to manipulate viscosity levels and produce desirable microstructures. The percentage listed in the Examples below are approximate and one of skill in the art can vary the percentages and even use additional components of the recipes without departing from the invention.

The first set of Examples relates most directly to the gel network formation aspect of the invention and the process of reducing the water activity is not shown. Examples 6 and later show the results of drying or water activity manipulating methods of the invention in particular.

Example 1

| Recipe 01 | [%] | [kcal] |
|---|---|---|
| chocolate liquor | 23 | 151.0 |
| anhydrous milk fat | 3.4 | 30.5 |
| NFMP | 3.1 | 10.8 |
| Sugar | 20 | 79.9 |
| Lecithin | 0.1 | 0.9 |
| skim milk | 50.4 | 11.2 |
| calories [kcal/100 g] | | 284.4 |
| REDUCTION CAL [%] | | 47 |

Example 2

| Recipe 02 | [%] | [kcal] |
|---|---|---|
| chocolate liquor | 10.75 | 70.6 |
| heavy cream | 8.7 | 34.8 |
| NFMP | 3.23 | 11.3 |
| Sugar | 21.5 | 85.9 |
| lecithin | 0.1 | 0.9 |
| skim milk | 55.72 | 12.4 |
| Calories [kcal/100 g] | | 215.8 |
| REDUCTION CAL [%] | | 60 |

Example 3

| Recipe 03 | [%] | [kcal] |
|---|---|---|
| chocolate liquor | 13 | 85.3 |
| heavy cream | 8.1 | 32.4 |
| NFMP | 6 | 21.0 |
| Sugar | 20 | 79.9 |
| lecithin | 0.1 | 0.9 |
| skim milk | 52.8 | 11.7 |
| calories [kcal/100 g] | | 231.2 |
| REDUCTION CAL [%] | | 57 |

All of the chocolate products from the above three specific examples result in light textured, chocolaty flavored compositions that are generally light and indulgent in flavor. The reduction in calories listed above (Reduction Cal [%]) refers to a comparison with Hershey's Milk Chocolate bars. Products such as these are stable at room temperature and can be frozen and thawed without adversely changing the texture or mouthfeel. In addition, the invention reduces the cost of preparing a standard of identity chocolate product and reduces the total calories of a standard of identity chocolate product.

Figure 5:
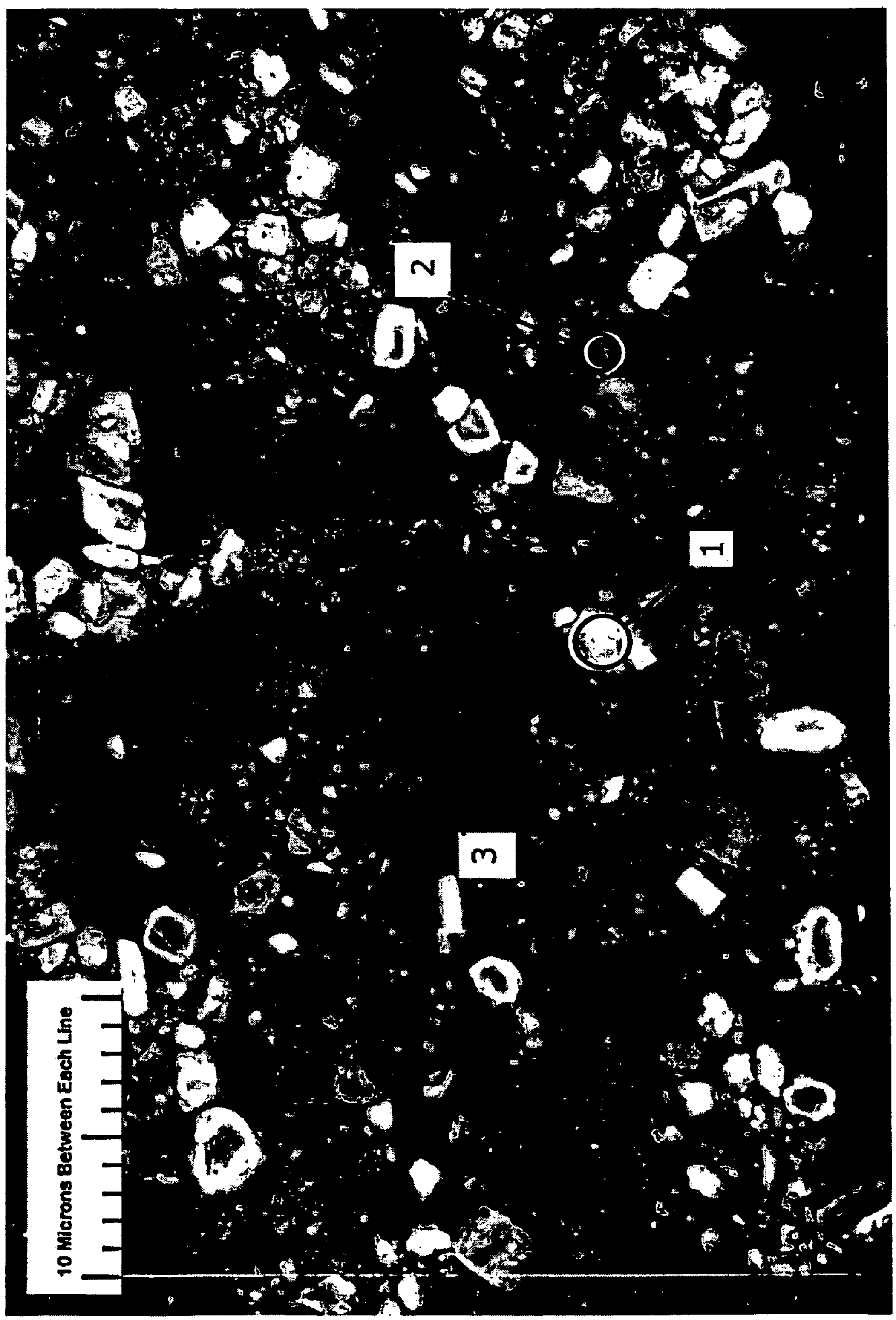
FIG. 5 is a photomicrograph showing a diluted conventional chocolate composition. Sugar crystals are indicated at (1). Cell wall particles from the cocoa are indicated at (2). The continuous phase is labeled (3).
Figure 6:
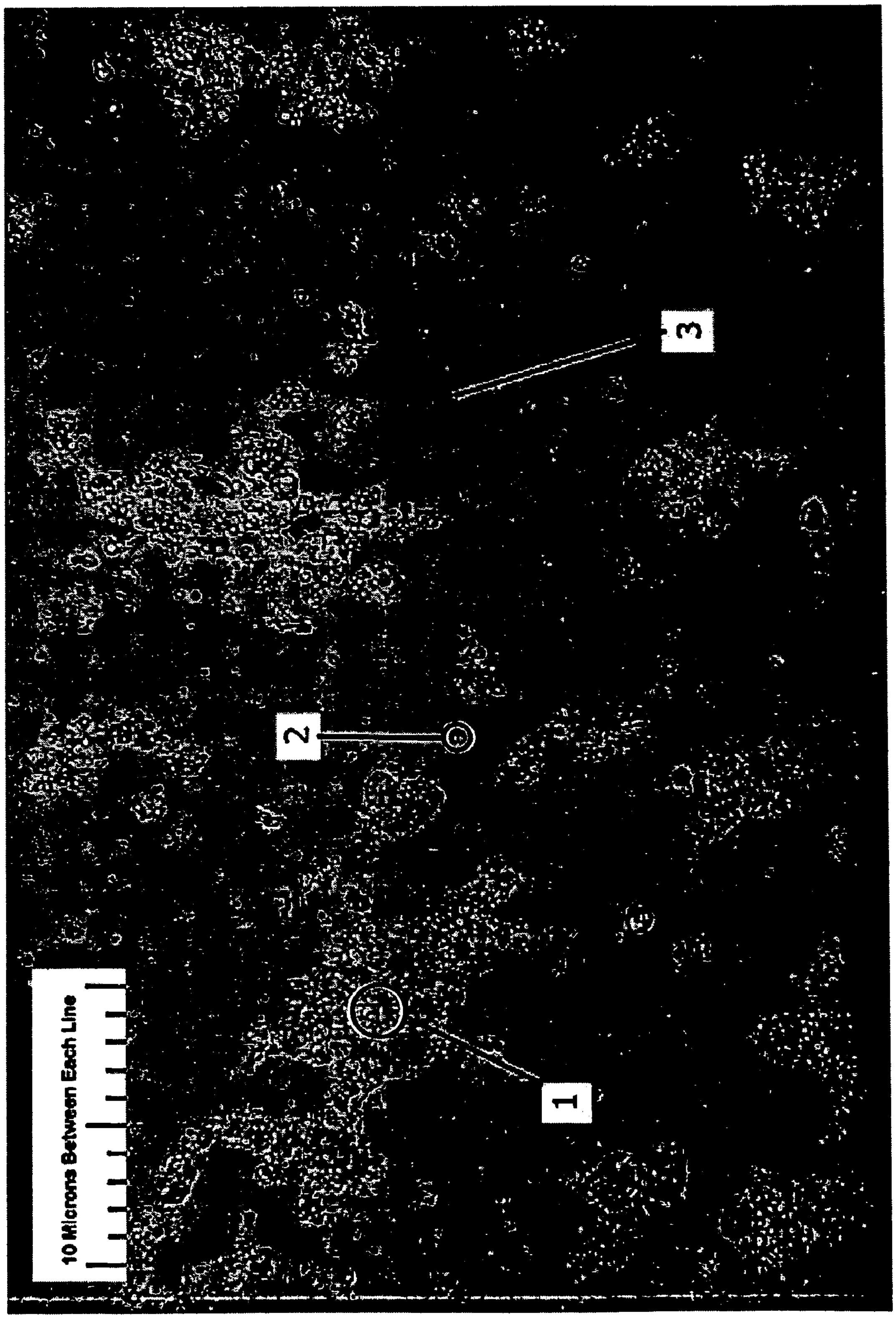
FIG. 6 is a photomicrograph of a diluted cocoa composition of the invention or one prepared according to the methods of the invention. The aqueous phase or continuous phase of the suspension is marked at (3). Number (1) points to a fragment or element of the gel network formed by starch and/or protein components, here from cocoa, and can include the cell wall components of cocoa. Crystallized cocoa butter droplets are present in the suspension and the refraction from droplets can be seen as lipid or fat droplets, as pointed out in (2).
Figure 7:
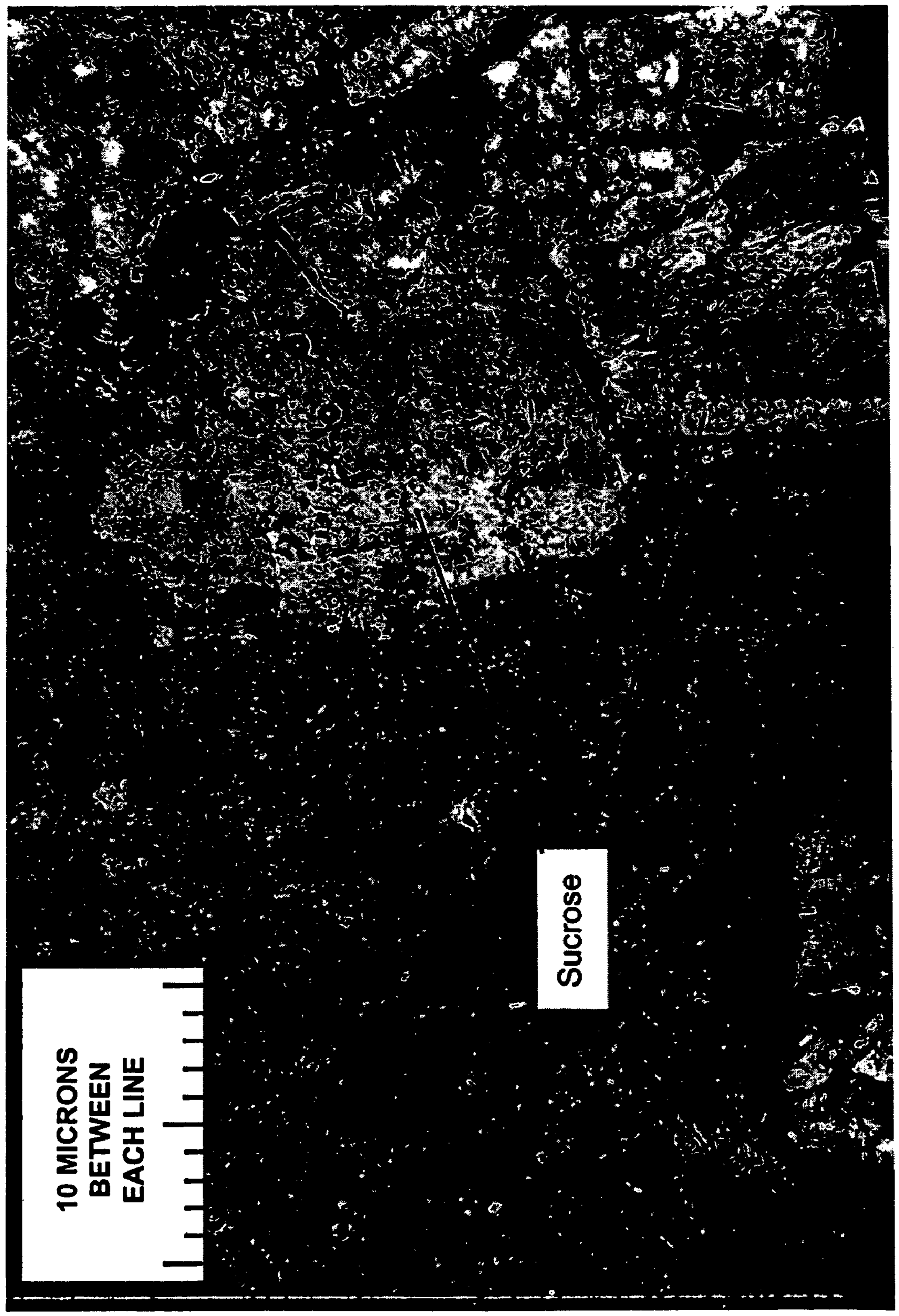
FIGS. 7 and 8 are photomicrographs of samples diluted in oil from a preparation of dried cocoa compositions prepared according to the optional process of drying or reducing water activity levels. Partially re-crystallized sucrose is labeled.
Figure 8:
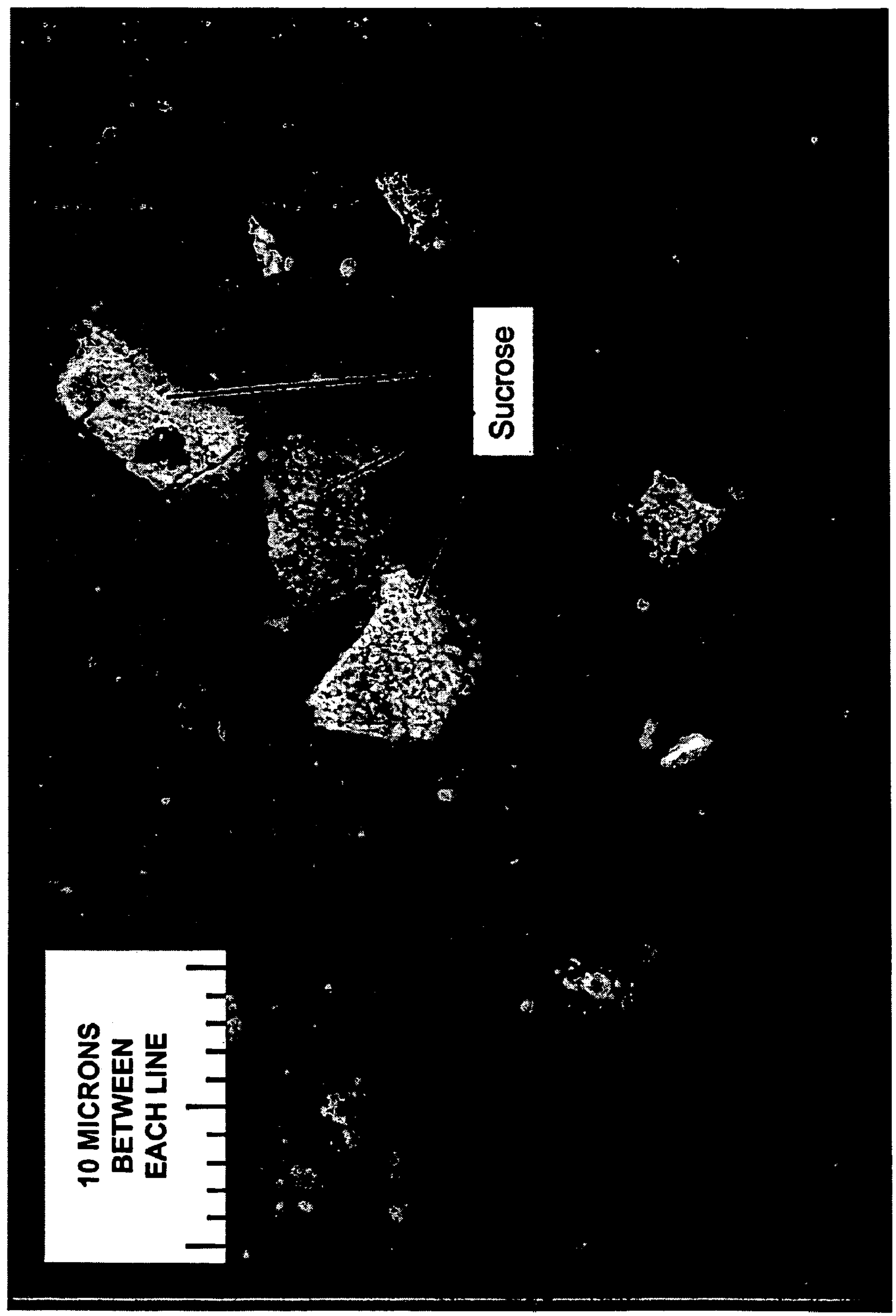
Figure 9:
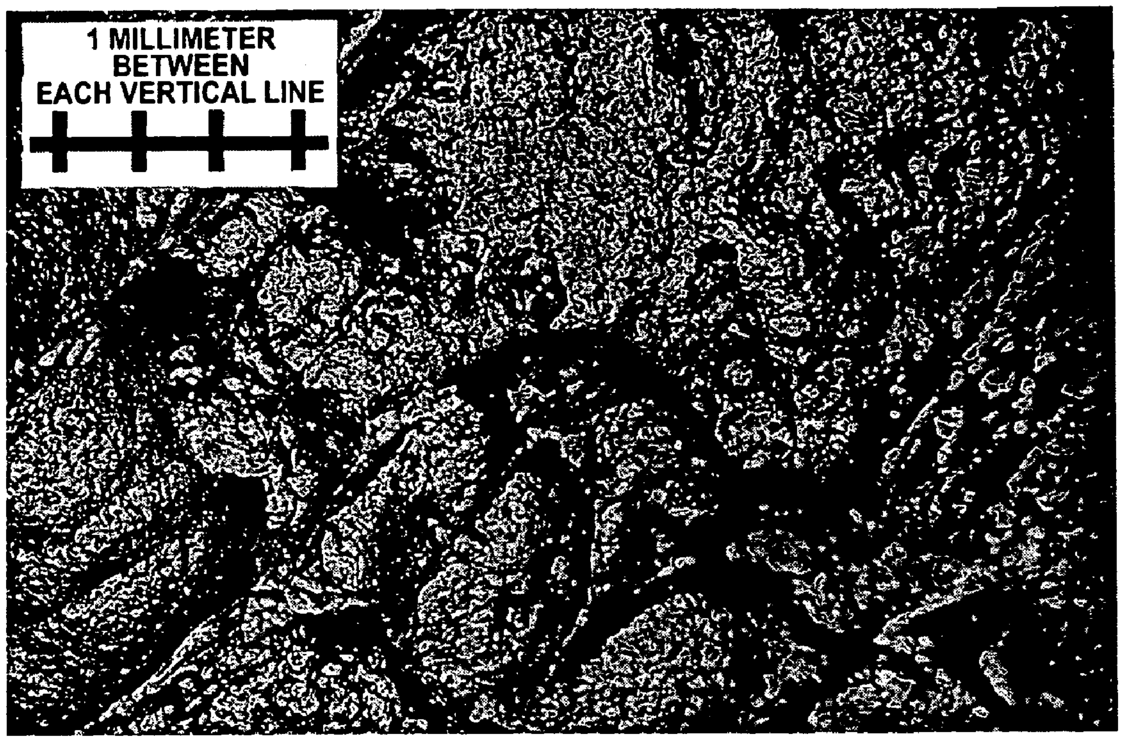
FIG. 9 is a photo of a partially dried oil-in-water suspension of the invention displaying a caramel-like viscosity.
Figure 10:
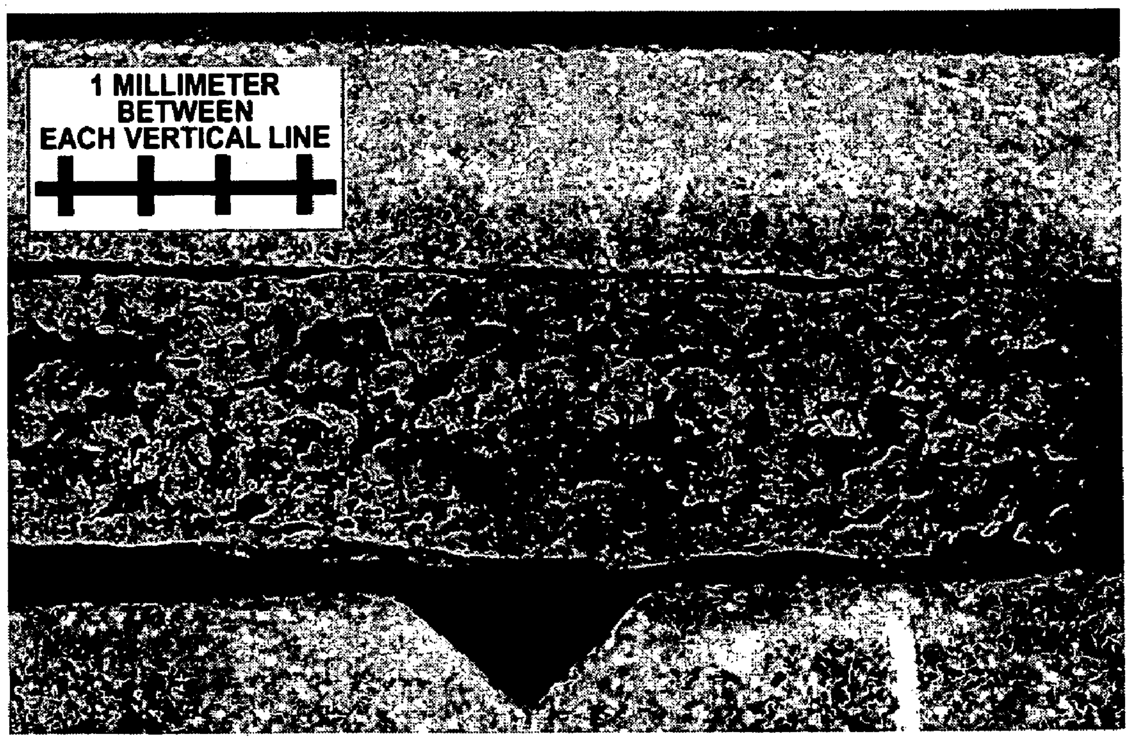
FIG. 10 is a photo an oil-in-water suspension of the invention following the optional drying to produce a crisp texture with very low water activity.
Figure 11:
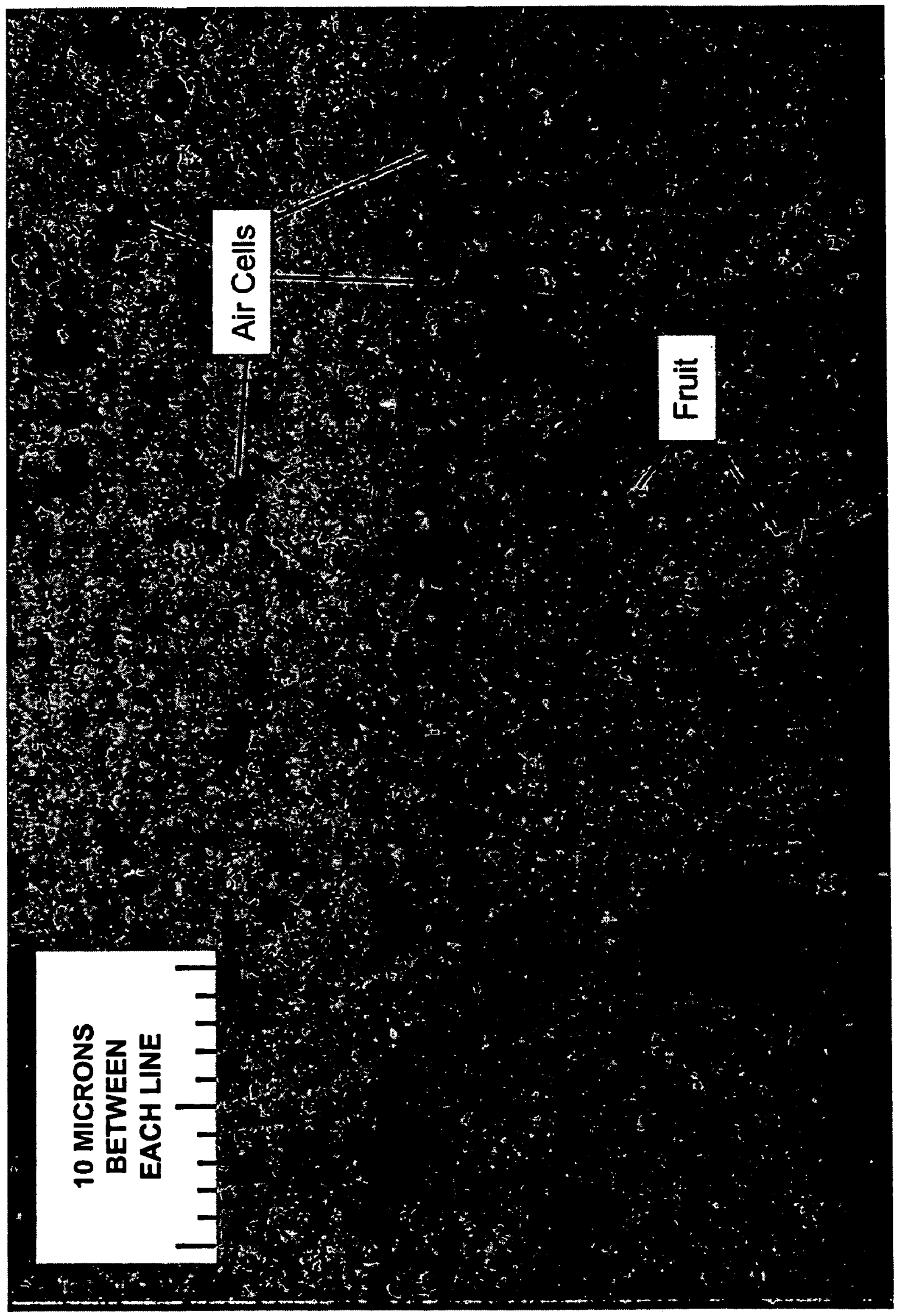
FIG. 11 is a photomicrograph of a dried oil-in-water suspension of the invention produced from fruit puree. The non-soluble fruit particles are labeled and air pockets or cells within the structure are present where moisture has been dried off. The water activity of such a structure would be low.
Figure 12:
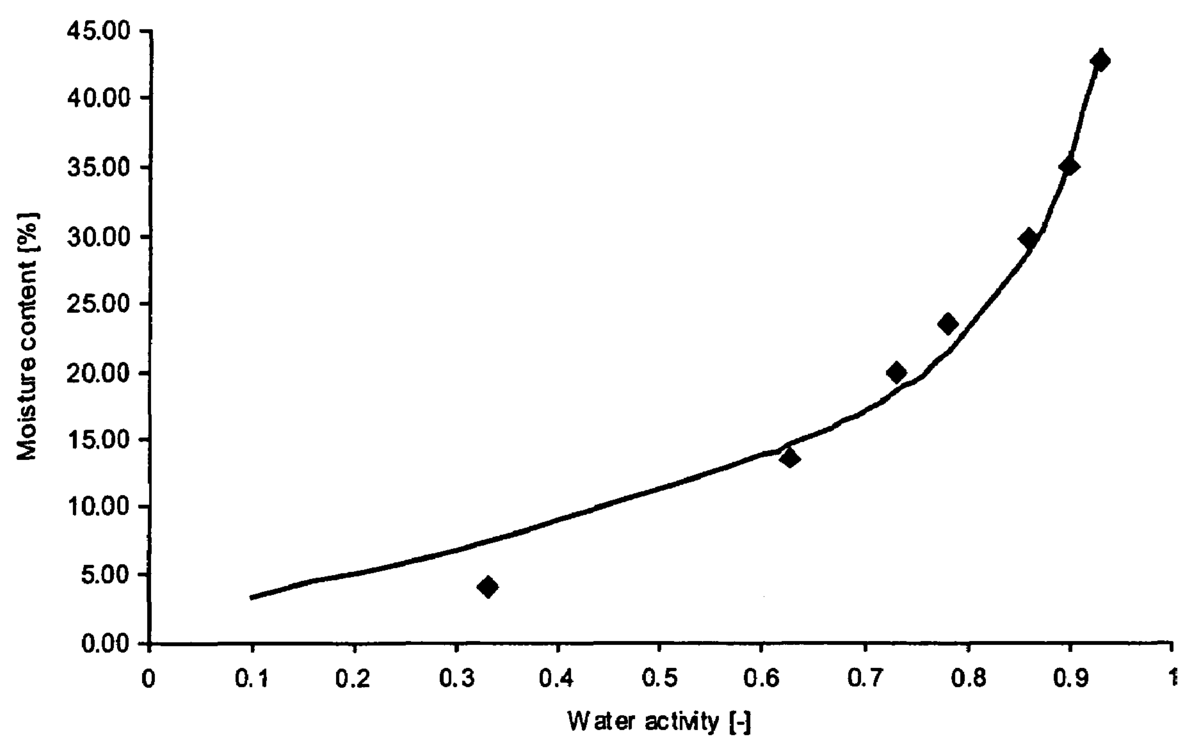
FIG. 12 shows data points and a predicted graph (see Lewicki P. P., Journal of Food Engineering 43 (2000), pp. 31-40) of the changes in water activity levels as moisture content changes. Different representative graphs would reflect different ingredients, such that the water activity of a salt composition would generally be lower than the water activity of a glucose composition at the same moisture content.

The chocolate products in FIG. 6 employed a simple method of preparation as noted above. The FIG. 5 sample is conventional semisweet chocolate product of the US market. To prepare the samples for microscopy, an aliquot is hand mixed with a spatula with 10 parts of mineral oil for FIG. 5 and demineralized water in FIG. 6. About ¼ of drop is deposited on a clean glass slide, spread with spatula, and covered with a glass cover slip and pressed for uniform thickness. Images can be viewed with transmitted, polarized compensated light using 16× objectives and the image captured with digital camera. FIG. 6 shows the microstructure of the gelatinized/crystallized oil-in-water suspension of the invention. Microparticles of cocoa bean material and cocoa butter oil droplets can be seen.

Example 4

The following recipes can be used to produce an oil-in-water suspension of the invention without a cocoa product, although cocoa product can be used. The nuts and fruit particles, such as seeds for strawberries, can be part of the insoluble particles in the suspension. As above, the percentages given are approximate and one of skill in the art can vary the percentages and even add additional ingredients without departing from the invention.

| | |
|---|---|
| Strawberry puree | 56.8% |
| Sugar | 20% |
| Fractionated palm kernel oil (Cebes 27–75) | 20% |
| Tapioca Starch | 3% |
| Lecithin | 0.2% |
| Banana puree | 51.8% |
| Sugar | 20% |
| Fractionated palm kernel oil (Cebes 27–75) | 20% |
| Guar gum | 1% |
| Lecithin | 0.2% |
| Pecans, grinded | 7% |
| Pear puree | 54.3% |
| Sugar | 20% |
| 17-Sterine | 17% |
| Xanthan | 1.5% |
| Lecithin | 0.2% |
| Macadamia nuts, ground | 7% |

-continued

| | |
|---|---|
| Banana puree | 69.8% |
| Sugar | 20% |
| Cocoa Liquor | 10% |
| Lecithin | 0.2% |
| Strawberries puree | 69.8% |
| Sugar | 20% |
| Cocoa Liquor | 10% |
| Lecithin | 0.2% |

In each case above, the ingredients are mixed in a rotor stator mixer and then heated to about 68° C. The products can be sterilized by longer term heating or ultra high temperature or ultra high temperature and pressure conditions prior to packaging. The fruit pudding examples, such as those above, allow one to produce stable products where the added ingredients, such as crushed nuts, stay in suspension over a period of time, for example 4 months or more.

Example 5

The following recipes refer to a chocolate liquid or hot chocolate embodiments of the invention. As above, the ingredients are listed as approximate percentages and one of skill in the art can vary the percentages and even use additional ingredients without departing from the invention.

| | |
|---|---|
| Recipe 1 | |
| Whole liquid milk | 68% |
| ADM 11-N Cocoa Powder | 2% |
| Hershey Special Dark paste | 30% |
| Recipe 2 | |
| Liquid skim milk | 75% |
| ADM 11-N Cocoa Powder | 2% |
| Hershey Special Dark paste | 23% |

For recipes 1 and 2, milk is heated to 40° C. in a kettle, run through a liquefier to mix for 3 minutes, homogenized at 1500 psi and a second stage at 5 psi, and then run through a Micro-Thermics UHT processor at 260° F. for 8 seconds.

| Recipe 3 | |
|---|---|
| Milk (2% milk) | 74% |
| NFMP | 2.5% |
| ADM 11-N cocoa powder | 2.5% |
| Hershey Special Dark paste | 21% |

For recipe 3 above, the ingredients are mixed together with a rotor/stator mixer and cooked in an open pan to about 90° C.

In each case, the resulting suspensions for recipes 1-3 above remain stable at room temperature, have a good chocolaty flavor, and good mouthfeel.

Reducing Water Activity/Manipulating Viscosity or Texture. As noted above, in preparing or after an oil-in-water suspension is created, the composition can be dried or the water activity level manipulated to produce a final product or composition. In the Examples below, a 2000 g sample of the initial oil-in-water suspension is mixed with a batch rotor/stator mixer (Silverson L4RT) at 9000 rpm for 30 seconds, homogenized at 300/30 bar (Soavi Panda 2K) and transferred to an open atmosphere cooker (Bottom Line 0306040). Temperature is set to 280° F. and rotor speed to 40 rpm. Samples at various times (Sample 01-06) are taken out of the pan in order to measure moisture and water activity values. The rest of Sample 06 is spread (height 6 mm) on a tray and put into a vacuum oven (Cole-Palmer N-05053-20) at 53° C. and −100 kPa to produce Sample 07. Water activity is determined using a Decagon Aqualab dew point meter (CX-2T) at 25° C. and moisture is measured using a Turbo Karl Fischer instrument (Metrohm Titrino Titrator 701/10).

Example 6

| Recipe Initial | [%] | [kcal] |
|---|---|---|
| chocolate liquor:sugar 50:50 | 14 | 91.9 |
| heavy cream | 5 | 20.0 |
| NFMP | 8 | 28.0 |
| Sugar | 20 | 79.9 |
| Lecithin | 0.3 | 2.7 |
| skim milk | 52.7 | 11.7 |
| calories [kcal/100 g] | | 234.2 |
| REDUCTION CAL [%] | | 57 |

Example 7

| Sample 01 | [%] | [kcal] |
|---|---|---|
| chocolate liquor:sugar 50:50 | 16.0 | 84.6 |
| Heavy cream | 2.9 | 11.4 |
| NFMP | 15.2 | 53.1 |
| Sugar | 22.9 | 91.5 |
| Lecithin | 0.3 | 3.1 |
| moisture | 42.7 | |
| | 100.0 | |
| calories [kcal/100 g] | | 243.7 |
| REDUCTION CAL [%] | | 55 |
| Moisture [%] | | 42.7 |
| Water activity [−] | | 0.93 |

Example 8

| Sample 02 | [%] | [kcal] |
|---|---|---|
| chocolate liquor:sugar 50:50 | 18.1 | 95.9 |
| Heavy cream | 3.2 | 12.9 |
| NFMP | 17.2 | 60.2 |
| Sugar | 25.9 | 103.6 |
| Lecithin | 0.4 | 3.5 |
| moisture | 35.1 | |
| | 100.0 | |
| Calories [kcal/100 g] | | 276.1 |
| REDUCTION CAL [%] | | 49 |
| Moisture [%] | | 35.1 |
| Water activity [−] | | 0.9 |

Example 9

| Sample 03 | [%] | [kcal] |
|---|---|---|
| chocolate liquor:sugar 50:50 | 19.7 | 103.8 |
| Heavy cream | 3.5 | 14.0 |
| NFMP | 18.6 | 65.2 |
| Sugar | 28.1 | 112.2 |
| Lecithin | 0.4 | 3.8 |
| moisture | 29.7 | |
| | 100.0 | |
| Calories [kcal/100 g] | | 299.0 |
| REDUCTION CAL [%] | | 45 |
| Moisture [%] | | 29.7 |
| Water activity [−] | | 0.86 |

Example 10

| Sample 04 | [%] | [kcal] |
|---|---|---|
| chocolate liquor:sugar 50:50 | 21.4 | 113.0 |
| heavy cream | 3.8 | 15.3 |
| NFMP | 20.3 | 70.9 |
| Sugar | 30.6 | 122.1 |
| Lecithin | 0.5 | 4.1 |
| moisture | 23.5 | |
| | 100.0 | |
| Calories [kcal/100 g] | | 325.4 |
| REDUCTION CAL [%] | | 40 |
| Moisture [%] | | 23.5 |
| Water activity [−] | | 0.78 |

Example 11

| Sample 05 | [%] | [kcal] |
|---|---|---|
| chocolate liquor:sugar 50:50 | 22.4 | 118.3 |
| heavy cream | 4.0 | 16.0 |
| NFMP | 21.2 | 74.3 |
| Sugar | 32.0 | 127.9 |
| Lecithin | 0.5 | 4.3 |
| Moisture | 19.9 | |
| | 100.0 | |
| calories [kcal/100 g] | | 340.7 |
| REDUCTION CAL [%] | | 37 |
| Moisture [%] | | 19.9 |
| Water activity [−] | | 0.73 |

Example 12

| Sample 06 | [%] | [kcal] |
|---|---|---|
| chocolate liquor:sugar 50:50 | 24.2 | 127.6 |
| heavy cream | 4.3 | 17.2 |
| NFMP | 22.9 | 80.1 |
| Sugar | 34.5 | 137.9 |
| Lecithin | 0.5 | 4.7 |
| moisture | 13.6 | |
| | 100.0 | |
| calories [kcal/100 g] | | 367.5 |
| REDUCTION CAL [%] | | 32 |
| Moisture [%] | | 13.6 |
| Water activity [−] | | 0.63 |

Example 13

| Sample 07 | [%] | [kcal] |
|---|---|---|
| chocolate liquor:sugar 50:50 | 26.8 | 141.6 |
| heavy cream | 4.8 | 19.1 |
| NFMP | 25.4 | 88.9 |
| Sugar | 38.3 | 153.0 |
| Lecithin | 0.6 | 5.2 |
| moisture | 4.1 | |
| | 100.0 | |
| Calories [kcal/100 g] | | 407.8 |
| REDUCTION CAL [%] | | 25 |
| Moisture [%] | | 4.12 |
| Water activity [−] | | 0.33 |

In addition, in any of the above examples or in the invention in general, micronized particles, ingredients, fat droplets, or the like can be used in addition to or as a substitute the a particular ingredient. The micronized components may further define a desired microstructure for a particular product or may provide beneficial stability characteristics to the product. One of skill in the art could select any available micronization technique and/or products for use.

Example 14

| Recipe INITIAL | [%] | [kcal] |
|---|---|---|
| chocolate liquor:sugar 50:50 | 14 | 91.9 |
| heavy cream | 5 | 20.0 |
| NFMP | 8 | 28.0 |
| Sugar | 20 | 79.9 |
| Lecithin | 0.3 | 2.7 |
| skim milk | 52.7 | 11.7 |
| calories [kcal/100 g] | | 234.2 |
| REDUCTION CAL [%] | | 57 |

Example 15

| Sample 01 | [%] | [kcal] |
|---|---|---|
| chocolate liquor:sugar 50:50 | 16.0 | 84.6 |
| heavy cream | 2.9 | 11.4 |
| NFMP | 15.2 | 53.1 |
| Sugar | 22.9 | 91.5 |

-continued

| Sample 01 | [%] | [kcal] |
|---|---|---|
| Lecithin | 0.3 | 3.1 |
| Moisture | 42.7 | |
| calories [kcal/100 g] | | 234.7 |
| REDUCTION CAL [%] | | 55 |
| Moisture [%] | | 42.7 |
| Water activity [−] | | 0.93 |

Example 17

| Sample 02 | [%] | [kcal] |
|---|---|---|
| chocolate liquor:sugar 50:50 | 18.1 | 95.9 |
| heavy cream | 3.2 | 12.9 |
| NFMP | 17.2 | 60.2 |
| Sugar | 25.9 | 103.6 |
| Lecithin | 0.4 | 3.5 |
| Moisture | 35.1 | |
| calories [kcal/100 g] | | 276.1 |
| REDUCTION CAL [%] | | 49 |
| Moisture [%] | | 35.1 |
| Water activity [−] | | 0.9 |

Example 18

| Sample 03 | [%] | [kcal] |
|---|---|---|
| chocolate liquor:sugar 50:50 | 19.7 | 103.8 |
| heavy cream | 3.5 | 14.0 |
| NFMP | 18.6 | 65.2 |
| Sugar | 28.1 | 112.2 |
| Lecithin | 0.4 | 3.8 |
| Moisture | 29.7 | |
| calories [kcal/100 g] | | 299.0 |
| REDUCTION CAL [%] | | 45 |
| Moisture [%] | | 29.7 |
| Water activity [−] | | 0.86 |

Example 19

| Sample 04 | [%] | [kcal] |
|---|---|---|
| chocolate liquor:sugar 50:50 | 21.4 | 113.0 |
| heavy cream | 3.8 | 15.3 |
| NFMP | 20.3 | 70.9 |
| Sugar | 30.6 | 122.1 |
| Lecithin | 0.5 | 4.1 |
| Moisture | 23.5 | |
| calories [kcal/100 g] | | 325.4 |
| REDUCTION CAL [%] | | 40 |
| Moisture [%] | | 23.5 |
| Water activity [−] | | 0.78 |

Example 20

| Sample 05 | [%] | [kcal] |
|---|---|---|
| chocolate liquor:sugar 50:50 | 22.4 | 118.3 |
| heavy cream | 4.0 | 16.0 |
| NFMP | 21.2 | 74.3 |
| Sugar | 32.0 | 127.9 |
| Lecithin | 0.5 | 4.3 |
| Moisture | 19.9 | |
| | 100.0 | |
| calories [kcal/100 g] | | 340.7 |
| REDUCTION CAL [%] | | 37 |
| Moisture [%] | | 19.9 |
| Water activity [−] | | 0.73 |

Example 21

| Sample 06 | [%] | [kcal] |
|---|---|---|
| chocolate liquor:sugar 50:50 | 24.2 | 127.6 |
| heavy cream | 4.3 | 17.2 |
| NFMP | 22.9 | 80.1 |
| Sugar | 34.5 | 137.9 |
| Lecithin | 0.5 | 4.7 |
| Moisture | 13.6 | |
| | 100.0 | |
| calories [kcal/100 g] | | 367.5 |
| REDUCTION CAL [%] | | 32 |
| Moisture [%] | | 13.6 |
| Water activity [−] | | 0.63 |

Example 22

| Sample 07 | [%] | [kcal] |
|---|---|---|
| chocolate liquor:sugar 50:50 | 26.8 | 141.6 |
| heavy cream | 4.8 | 19.1 |
| NFMP | 25.4 | 88.9 |
| Sugar | 38.3 | 153.0 |
| Lecithin | 0.6 | 5.2 |
| Moisture | 4.1 | |
| | 100.0 | |
| calories [kcal/100 g] | | 407.8 |
| REDUCTION CAL [%] | | 25 |
| Moisture [%] | | 4.12 |
| Water activity [−] | | 0.33 |

Example 23

| Sample 01 | [%] |
|---|---|
| chocolate liquor:sugar (50:50) | 15.0 |
| NFMP | 12.0 |
| Lecithin | 0.3 |
| Inulin | 5.0 |
| corn syrup high fructose | 8.0 |
| Water | 59.7 |
| Total | 100.0 |
| Water activity [−] | 0.96 |

Example 24

| Sample 02 | [%] |
|---|---|
| chocolate liquor:sugar (50:50) | 19.9 |
| NFMP | 15.9 |
| Lecithin | 0.4 |
| Inulin | 6.6 |
| corn syrup high fructose | 10.6 |
| Water | 46.5 |
| Total | 100.0 |
| Water activity [−] | 0.94 |

Example 25

| Sample 03 | [%] |
|---|---|
| chocolate liquor:sugar (50:50) | 26.0 |
| NFMP | 20.8 |
| Lecithin | 0.5 |
| Inulin | 8.7 |
| corn syrup high fructose | 13.9 |
| Water | 30.1 |
| Total | 100.0 |
| Water activity [−] | 0.86 |

Example 26

| Sample 04 | [%] |
|---|---|
| chocolate liquor:sugar (50:50) | 28.8 |
| NFMP | 23.1 |
| Lecithin | 0.6 |
| Inulin | 9.6 |
| corn syrup high fructose | 15.4 |
| Water | 22.5 |
| Total | 100.0 |
| Water activity [−] | 0.78 |

Example 28

| Sample 05 | [%] |
|---|---|
| Chocolate liquor:sugar (50:50) | 36.0 |
| NFMP | 28.8 |
| Lecithin | 0.7 |
| Inulin | 12.0 |
| corn syrup high fructose | 19.2 |
| Water | 3.2 |
| Total | 100.0 |
| Water activity [−] | 0.22 |

Example 29

| Sample 01 | [%] |
|---|---|
| Chocolate liquor:sucrose (50:50) | 17.1 |
| Anhydrous milk fat | 3.9 |
| NFMP | 13.1 |
| Sucrose | 19.7 |
| Lecithin | 0.4 |
| fruit powder raspberry | 5.3 |
| Moisture | 40.5 |
| Total | 100.0 |

Example 30

| Sample 02 | [%] |
|---|---|
| Chocolate liquor:sucrose (50:50) | 18.6 |
| Anhydrous milk fat | 4.3 |
| NFMP | 14.3 |
| Sucrose | 21.5 |
| Lecithin | 0.4 |
| fruit powder raspberry | 5.7 |
| Moisture | 35.1 |
| Total | 100.0 |
| Water activity [−] | 0.9 |

Example 31

| Sample 03 | [%] |
|---|---|
| Chocolate liquor:sucrose (50:50) | 19.5 |
| Anhydrous milk fat | 4.5 |
| NFMP | 15.0 |
| Sucrose | 22.5 |
| Lecithin | 0.5 |
| fruit powder raspberry | 6.0 |
| Moisture | 31.9 |
| Total | 100.0 |
| Water activity [−] | 0.87 |

Example 32

| Sample 04 | [%] |
|---|---|
| Chocolate liquor:sucrose (50:50) | 22.0 |
| Anhydrous milk fat | 5.1 |
| NFMP | 16.9 |
| Sucrose | 25.3 |
| Lecithin | 0.5 |
| fruit powder raspberry | 6.8 |
| Moisture | 23.5 |
| Total | 100.0 |
| Water activity [−] | 0.81 |

Example 33

| Sample 05 | [%] |
|---|---|
| Chocolate liquor:sucrose (50:50) | 23.4 |
| Anhydrous milk fat | 5.4 |
| NFMP | 18.0 |
| Sucrose | 27.1 |
| Lecithin | 0.5 |
| fruit powder raspberry | 7.2 |
| Moisture | 18.3 |
| Total | 100.0 |
| Water activity [−] | 0.72 |

Example 34

| Sample 06 | [%] |
|---|---|
| Chocolate liquor:sucrose (50:50) | 25.0 |
| Anhydrous milk fat | 5.8 |
| NFMP | 19.2 |
| Sucrose | 28.8 |
| Lecithin | 0.6 |
| fruit powder raspberry | 7.7 |
| Moisture | 13.0 |
| Total | 100.0 |
| Water activity [−] | 0.62 |

Examples 14-34 above list either the "initial" moisture content of water activity level, or the moisture content or water activity after drying for a time period (for example, Sample 01 to 06) as noted above. By varying the length of the drying period, one can prepare a product with a desired water activity level and having the desired physical characteristics and/or microbiological stability.

As shown in the examples above, water activity levels can be reduced below 0.3, and even as low as about 0.2, which will produce a crispy final product. Shorter drying periods can result in water activity of about 0.9 or about 0.85 or below. Clearly, one of skill in the art can use the oil-in-water suspensions of the invention in combination with a process to reduce water activity to produce a variety of final products or compositions having one of more desired characteristics, textures, or microbiological stability profiles.

The examples presented above and the contents of the application define and describe examples of the many food ingredients and products that can be produced according to the invention. None of the examples and no part of the description should be taken as a limitation on the scope of the invention as a whole or of the meaning of the following claims.

What is claimed is:

1. A solid chocolate food product or ingredient having a crystallized and gelatinized structure in an oil-in-water suspension, the food product or ingredient comprising an oil or fat phase consisting essentially of cocoa butter, and further comprising an aqueous phase comprising at least about 10% chocolate liquor or equivalent in cocoa solids, wherein the soluble polysaccharides and protein are present in the cocoa solids are formed into a gelatinized network structure capable of stabilizing the suspension into a stable solid at room temperature without added hydrocolloids or food starches, and wherein insoluble particles from at least the cocoa solids are dispersed in the suspension, and wherein the food product or ingredient has a water activity level of about 0.9 or below.

2. The food product or ingredient of claim 1, further comprising at least about 5% milk solids.

3. The food product or ingredient of claim 1, wherein the product contains 35% or more chocolate liquor.

4. The food product or ingredient of claim 1, wherein the cocoa solids content is supplied as cocoa powder.

5. The food product or ingredient of claim 1, wherein the cocoa butter content is supplied as a processed chocolate product.

6. The food product or ingredient of claim 1, wherein lecithin is additionally present.

7. The food product or ingredient of claim 1, wherein the cocoa butter content is at least about 18%.

8. The food product or ingredient of claim 1, having at least about 35% total cocoa.

9. The food product or ingredient of claim 8 processed into a chocolate containing product.

10. The food product or ingredient of claim 1, further comprising at least about 12% total milk solids.

11. The food product or ingredient of claim 10 processed into a semisweet chocolate or milk chocolate containing product.

12. The food product or ingredient of claim 1, having at least about 5% nutritive carbohydrate sweetener.

13. The food product or ingredient of claim 10, having at least about 5% nutritive carbohydrate sweetener.

14. The food product or ingredient of claim 13, processed into a reduced or low calorie or sugar free product.

15. The food product or ingredient of claim 1, comprising at least about 20% chocolate liquor or equivalent in cocoa solids.

16. The food product or ingredient of claim 1, having one or more of an artificial sweetener, xylitol, erythritol, mannitol, sorbitol, lactitol, isomaltulose, or maltitol.

17. The food product or ingredient of claim 1, having one or more vitamin or mineral food additives.

18. The food product or ingredient of claim 1, wherein the chocolate liquor or cocoa solids have an enhanced or increased level of anti-oxidants or polyphenols.

19. The food product or ingredient of claim 1, wherein the food ingredient comprises one or more of: concentrated milk, evaporated milk, sweetened condensed milk, dried milk, skim milk, concentrated skim milk, evaporated skim milk, sweetened condensed skim milk, cocoa powder, heavy cream, vanillin, whey protein, anhydrous milk fat, non fat dry milk protein, whole milk powder, soy milk, soy milk protein, lecithin, and sugar.

20. A method of making a chocolate food product or ingredient comprising:

providing a fat or oil phase comprising cocoa butter and optionally an emulsifier;

providing an aqueous or continuous phase comprising water and at least about 4% non fat cocoa solids;

mixing the oil or fat phase with the aqueous or continuous phase at a temperature above the melting point of the cocoa butter;

treating or heating the mixed phases under conditions where protein and starch components of the cocoa solids alone are capable of producing a gelatinized network in a stable solid without added emulsifiers or hydrocolloids and having a crystallized and gelatinized structure in an oil-in-water suspension at room temperature; and drying to reduce the water activity level to about 0.9 or below.

21. The method of claim 20, wherein further protein and starch components are added through the addition of one or more of: hydrocolloid; milk protein; vegetable protein; fruit protein; starch; or polysaccharide.

22. The method of claim 20, wherein an emulsifier is present.

23. The method of claim 20, further comprising adding food grade gas by aerating or whipping.

24. The method of claim 20, wherein one or more vitamin or mineral food additives are present in the aqueous or continuous phase.

25. method of claim 20, further comprising removing substantially all of the insoluble particles.

26. The method of claim 20, wherein treating or heating the mixed phases comprises heating the mixed phases to about 68° C. or higher.

27. The method of claim 20, wherein treating or heating the mixed phases comprises allowing the mixture to rest at room temperature for a period of time sufficient to form a gel network.

28. The method of claim 20, wherein mixing the oil or fat phase with the aqueous or continuous phase comprises mixing with a static mixer, a homogenizer, or dynamic mixer.

29. The method of claim 20, wherein the food ingredient is further processed into a product containing dark chocolate, milk chocolate, bittersweet chocolate, semisweet chocolate, or white chocolate.

30. The method of claim 20, further comprising adding one or more of chocolate liquor, cocoa powder, heavy cream, anhydrous milk fat, whey protein concentrates, non-fat milk protein, soy milk, whole milk powder, sugar, lecithin, vanillin, and skim milk to one or both of the fat or oil phase or the aqueous of continuous phase.

31. The method of claim 20, wherein the cocoa solids contain an enhanced or increased level of anti-oxidants or polyphenols.

32. A food product or ingredient produced by the method of claim 20, having a water activity of less than about 0.85.

33. The food product or ingredient of claim 32, having a water activity of less than about 0.65.

34. The food product or ingredient of claim 32, having a water activity of less than about 0.55.

35. The food product or ingredient of claim 32, having a water activity of less than about 0.45.

36. The food product or ingredient of claim 32, having a water activity of less than about 0.35.

37. The food product or ingredient of claim 32, further comprising one or more of nuts, peanuts, almonds, peanut butter, caramel, and edible inclusions.

38. A method of producing an edible product or ingredient or composition comprising:

providing a fat phase comprising at least one fat component that is at least partially crystallized at room temperature;

providing an aqueous phase comprising water, at least about 4% non fat cocoa solids, and one or more fruit;

mixing the phases;

heating the mixed phases to form a gel network comprised of proteins and/or starch and/or cell wall material components and having a crystallized and gelatinized structure into a stable oil-in-water suspension at room temperature; and drying the mixed phases to reduce the water activity level, whereby the cocoa solids present are alone capable of producing a Gelatinized network in a stable solid without added emulsifiers or hydrocolloids.

39. The method of claim 38, further comprising adding an emulsifier.

40. The method of claim 39, wherein the emulsifier is lecithin.

41. The method of claim 38, wherein the fat phase comprises one or more of; cocoa butter, chocolate liquor, fractionated and/or hydrogenated and/or interesterified palm kernel oil, palm oil, coconut oil, cotton seed oil, sunflower oil, canola oil, and corn oil.

42. The method of claim 38, wherein the aqueous phase comprises one or more of: cocoa solids, fruit puree, berry puree, milk, soy milk, evaporated milk, soy milk, and condensed milk.

43. The method of claim 38, wherein the aqueous phase further comprises one or more of: a cocoa powder, a hydrocolloid.

44. A food product or ingredient or composition produced by the method of claim 38, wherein the water activity is less than about 0.85.

45. The food product or ingredient or composition of claim 44, having a water activity of less than about 0.65.

46. The food product or ingredient or composition of claim 44, having a water activity of less than about 0.55.

47. The food product or ingredient or composition of claim 44, having a water activity of less than about 0.45.

48. The food product or ingredient or composition of claim 44, having a water activity of less than about 0.35.

49. The food product or ingredient or composition of claim 44, having one or more of an artificial sweetener, xylitol, erythritol, mannitol, sorbitol, lactitol, isomaltulose, or maltitol.

50. The food product or ingredient or composition of claim 49, processed into a reduced or low calorie or sugar free product.

51. The food product or ingredient or composition of claim 44, having one or more vitamin or mineral food additives.

52. The food product or ingredient of one of claims 1, 32, or 44, further comprising one or more of nuts, peanuts, almonds, peanut butter, caramel, and edible inclusions.

53. The food product or ingredient of claim 44, further comprising one or more of nuts, peanuts, almonds, peanut butter, caramel, and edible inclusions.

* * * * *